(12) United States Patent
Heink et al.

(10) Patent No.: US 7,570,386 B2
(45) Date of Patent: Aug. 4, 2009

(54) SYSTEMS AND METHODS THAT COMPENSATE FOR SCAN PATH ERRORS IN A MULTI-BEAM ELECTROPHOTOGRAPHIC IMAGING APPARATUS

(75) Inventors: Philip J. Heink, Lexington, KY (US); Christopher D. Jones, Georgetown, KY (US); Daniel R. Klemer, Lexington, KY (US); Danny W. Peters, Lexington, KY (US)

(73) Assignee: Lexmark International, Inc. KY (US)

( * ) Notice: Subject to any disclaimer, the term of this patent is extended or adjusted under 35 U.S.C. 154(b) by 870 days.

(21) Appl. No.: 11/227,777

(22) Filed: Sep. 15, 2005

(65) Prior Publication Data

US 2007/0058221 A1  Mar. 15, 2007

(51) Int. Cl.
*G06K 15/00* (2006.01)

(52) U.S. Cl. .......... 358/1.18; 347/234; 347/235; 347/248; 347/250; 347/116; 358/401; 399/301

(58) Field of Classification Search .......... 358/1.18
See application file for complete search history.

(56) References Cited

U.S. PATENT DOCUMENTS

| | | | |
|---|---|---|---|
| 2,537,900 A | 1/1951 | Lee et al. |
| 4,190,325 A | 2/1980 | Moreno |
| 4,236,790 A | 12/1980 | Smith |
| 4,270,131 A | 5/1981 | Tompkins et al. |
| 4,609,945 A | 9/1986 | Oguino |
| 4,620,237 A | 10/1986 | Traino |
| 4,693,555 A | 9/1987 | Arai et al. |
| 4,694,156 A | 9/1987 | Swanberg |
| 4,720,168 A | 1/1988 | Kaneko |
| 4,721,373 A | 1/1988 | Sugiyama |
| 4,729,617 A | 3/1988 | Shimada et al. |
| 4,733,253 A | 3/1988 | Daniele |
| 4,737,798 A | 4/1988 | Lonis et al. |
| 4,753,524 A | 6/1988 | Sugiyama |
| 4,815,059 A | 3/1989 | Nakayama et al. |
| 4,855,987 A | 8/1989 | Versluis |
| 4,878,066 A | 10/1989 | Shiraishi |
| 4,950,889 A | 8/1990 | Budd et al. |
| 4,978,849 A | 12/1990 | Goddard et al. |
| 5,122,658 A | 6/1992 | Ando |
| 5,164,783 A | 11/1992 | Taguchi et al. |
| 5,164,843 A | 11/1992 | Swanberg |
| 5,175,636 A | 12/1992 | Swanberg |
| 5,189,546 A | 2/1993 | Iizuka |

(Continued)

FOREIGN PATENT DOCUMENTS

EP  0 572 806 A2  12/1993

(Continued)

*Primary Examiner*—King Y Poon
*Assistant Examiner*—David S Cammack
(74) *Attorney, Agent, or Firm*—Stevens & Showalter, L.L.P.

(57) ABSTRACT

The positioning of image data written along a laser beam scan path in the scan direction, e.g., the margin and/or line length is adjusted in a manner that compensates for changes in the laser beam scan path as a result of one or more operating conditions, such as changes in temperature. Further, the positioning of image data in the process direction may be adjusted in a manner that compensates for changes in the laser beam scan path as a result of the one or more operating conditions.

20 Claims, 11 Drawing Sheets

U.S. PATENT DOCUMENTS

| | | |
|---|---|---|
| 5,196,957 A | 3/1993 | Brueggemann |
| 5,210,650 A | 5/1993 | O'Brien et al. |
| 5,255,015 A | 10/1993 | Noethen et al. |
| 5,276,544 A | 1/1994 | Maeda |
| 5,355,154 A | 10/1994 | Guerin |
| 5,381,165 A | 1/1995 | Lofthus et al. |
| 5,412,510 A | 5/1995 | Iizuka et al. |
| 5,452,073 A | 9/1995 | Kataoka |
| 5,499,107 A | 3/1996 | Kuroda |
| 5,539,441 A | 7/1996 | Appel et al. |
| 5,541,637 A | 7/1996 | Ohashi et al. |
| 5,576,753 A | 11/1996 | Kataoka et al. |
| 5,617,132 A | 4/1997 | Fisli |
| 5,638,109 A | 6/1997 | Agano |
| 5,751,462 A | 5/1998 | Shiraishi et al. |
| 5,828,479 A | 10/1998 | Takano et al. |
| 5,828,925 A | 10/1998 | Yoshizawa |
| 5,864,739 A | 1/1999 | Kaneko et al. |
| 5,933,184 A | 8/1999 | Ishigami et al. |
| 6,108,115 A | 8/2000 | Kimura et al. |
| 6,208,449 B1 | 3/2001 | Suzuki |
| 6,243,123 B1 | 6/2001 | Tanimoto et al. |
| 6,362,847 B1 | 3/2002 | Pawley et al. |
| 6,476,370 B1 | 11/2002 | Suzuki et al. |
| 6,549,225 B2 | 4/2003 | Ream et al. |
| 6,657,650 B1 * | 12/2003 | Omelchenko et al. ....... 347/234 |
| 6,833,856 B2 | 12/2004 | Maeda |
| 2001/0017645 A1 * | 8/2001 | Toda .......................... 347/116 |
| 2001/0028387 A1 * | 10/2001 | Maeda ....................... 347/232 |

FOREIGN PATENT DOCUMENTS

| | | |
|---|---|---|
| JP | 63115120 A | 5/1988 |
| JP | 06134644 A | 5/1994 |

* cited by examiner

**Beam Scan model for
left to right scanning beam**

SYSTEMS AND METHODS THAT COMPENSATE FOR SCAN PATH ERRORS IN A MULTI-BEAM ELECTROPHOTOGRAPHIC IMAGING APPARATUS

BACKGROUND OF THE INVENTION

The present invention relates in general to an electrophotographic imaging apparatus, and more particularly to systems and methods that compensate for time varying scan path errors in a multi-beam electrophotographic imaging apparatus.

In electrophotography, a latent image is formed by exposing select portions of an electrostatically charged photoconductive surface to laser light. Essentially, the density of the electrostatic charge on the photoconductive surface is altered in areas exposed to the laser beam relative to those areas unexposed to the laser beam. The latent electrostatic image thus created is developed into a visible image by exposing the photoconductive surface to toner, which contains pigment components and thermoplastic components. When so exposed, the toner is attracted to the photoconductive surface in a manner that corresponds to the electrostatic density altered by the laser beam. The toner pattern is subsequently transferred from the photoconductive surface to the surface of a print substrate, such as paper, which has been given an electrostatic charge opposite that of the toner.

A fuser assembly then applies heat and pressure to the toned substrate before the substrate is discharged from the apparatus. The applied heat causes constituents including the thermoplastic components of the toner to flow into the interstices between the fibers of the medium and the pressure promotes settling of the toner constituents in these voids. As the toner is cooled, it solidifies and adheres the toner image to the substrate.

In a conventional color electrophotographic imaging apparatus, such as a color laser printer, a color image to be printed is decomposed into cyan (C), yellow (Y), magenta (M) and black (K) color planes, which are developed and registered to form a corresponding composite toned image on a print substrate. Under this arrangement, the quality of the composite toned image printed onto the print substrate is affected by how accurately each color plane is registered to the remainder of the color planes. During the course of manufacturing such an apparatus, a registration process is typically performed to minimize the vertical (process) direction and horizontal (scan) direction registration differences between the CYMK color planes. Further, an operator may periodically implement a registration process to minimize the process direction and scan direction registration differences between the CYMK color planes, e.g., after new supplies are installed in the apparatus.

However, misregistration of one or more of the CYMK color planes may occur during normal operation of the apparatus, even in a precisely registered system, due to operational influences such as changes in temperature, humidity, etc. within the apparatus. For example, thermally induced expansion and contraction of optical components including lens elements can change their indicies of refraction, which can cause process and or scan direction shifts in a corresponding laser beam scan path relative to that beam's scan path at the time of a previous registration process.

SUMMARY OF THE INVENTION

According to an aspect of the present invention, a method of correcting for scan path errors in an electrophotographic device comprises defining a baseline scan interval by sampling a scan line interval, such as a start of scan to end of scan interval, at a first time. Additionally, line length characterizing data is established that characterizes line length variations as a function of at least one operating condition. For example, the line length characterizing data may be expressed as an equation that relates to line length change as a function of temperature or other factor. During operation of the device, a test sample interval is defined by sampling the scan line interval at a second time and a normalized sample is computed by normalizing the test sample interval relative to the baseline scan interval. A normalized line length is then computed based upon the normalized sample and the line length characterizing data, and a line length magnification is computed based at least upon the previously computed normalized line length. Linearity correction data is then computed that is processed to generally evenly distribute print elements along a scan line based at least upon the line length magnification by varying the timing of select print elements along a scan line.

Print margins may also be compensated by establishing margin characterizing data that characterizes margin variations as a function of the at least one operating condition. For example, the margin characterizing data may be expressed as an equation that relates to margin change as a function of temperature in a manner analogous to the line length characterizing data. A normalized margin is computed based upon the normalized sample and the margin characterizing data, a margin magnification is computed based upon at least the previously computed normalized margin and a new margin value is computed based at least upon the margin magnification. Similarly, process direction shifts may be compensated for by establishing process direction characterizing data that characterizes process direction variations as a function of the at least one operating condition, computing a normalized process shift based upon the normalized sample and implementing a process correction based at least upon the normalized process shift.

According to another aspect of the present invention, a system for correcting time varying scan path errors in an electrophotographic device comprises a controller, a polygon mirror, at least one sensor communicably coupled to the controller for determining at least one of a start of scan and an end of scan to define a scan interval, and a memory device. The polygon mirror is controlled by the controller to rotate at a constant velocity and directs a beam, which is modulated based upon image data supplied by the controller, to sweep across a photoconductive surface. The memory device has stored therein, line length characterizing data that characterizes a line length as a function of at least one operating condition, e.g., temperature or other factor, and a baseline scan interval determined by sampling the scan line interval at a first time.

The controller is operatively configured to sample the scan line interval at a second time, such as during operation of the system, compute a normalized sample by normalizing the test sample interval relative to the baseline scan interval, compute a normalized line length based upon the normalized sample and the line length characterizing data, compute a line length magnification based at least upon the normalized line length and compute linearity correction data that is processed to generally evenly distribute print elements along a scan line based at least upon the line length magnification by varying the timing of select print elements along a scan line.

The memory device may further have stored therein, margin characterizing data that characterizes a margin value as a function of at least one operating condition and a baseline margin interval determined by sampling a margin interval at a first time. Under this arrangement, margin corrections may be implemented by the controller where the controller is further operatively configured to compute a normalized margin based upon the normalized sample and the margin characterizing data, compute a margin magnification based upon at least the normalized margin and compute a new margin based at least upon the margin magnification. Similarly, the memory device may further have stored therein, process direction characterizing data that characterizes process direction variations as a function of the at least one operating condition. Under this arrangement, process shift corrections may be implemented by the controller where the controller is further operatively configured to compute a normalized process shift based upon the normalized sample and implement a process correction based at least upon the normalized process shift.

According to yet another aspect of the present invention, a method of correcting temperature induced scan path errors in an electrophotographic device comprises defining a baseline scan interval by sampling a scan line interval at a first time, establishing margin temperature data that characterizes a margin as a function of temperature, establishing line length temperature data that characterizes line length as a function of temperature and establishing thermal compensation temperature data that characterizes process direction position shifts as a function of temperature. During operation, compensations may be performed by defining a test sample interval by sampling the scan line interval at a second time and by computing a normalized sample by normalizing the test sample interval relative to the baseline scan interval, computing a normalized margin based upon the normalized sample and the margin temperature data and by computing a normalized line length based upon the normalized sample and the line length temperature data. The device may also compute a normalized process shift based upon the normalized sample and the thermal compensation temperature data.

With the above normalized values computed, a margin magnification is computed based at least upon the normalized margin and a line length magnification is computed based at least upon the normalized line length. Subsequently, linearity correction data may be computed that generally evenly distributes print elements along a scan line based at least upon the margin magnification and the line length magnification. Further, a process direction compensation may be implemented based at least in part upon the normalized process shift.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

An Exemplary Electrophotographic Imaging Apparatus

Figure 1:
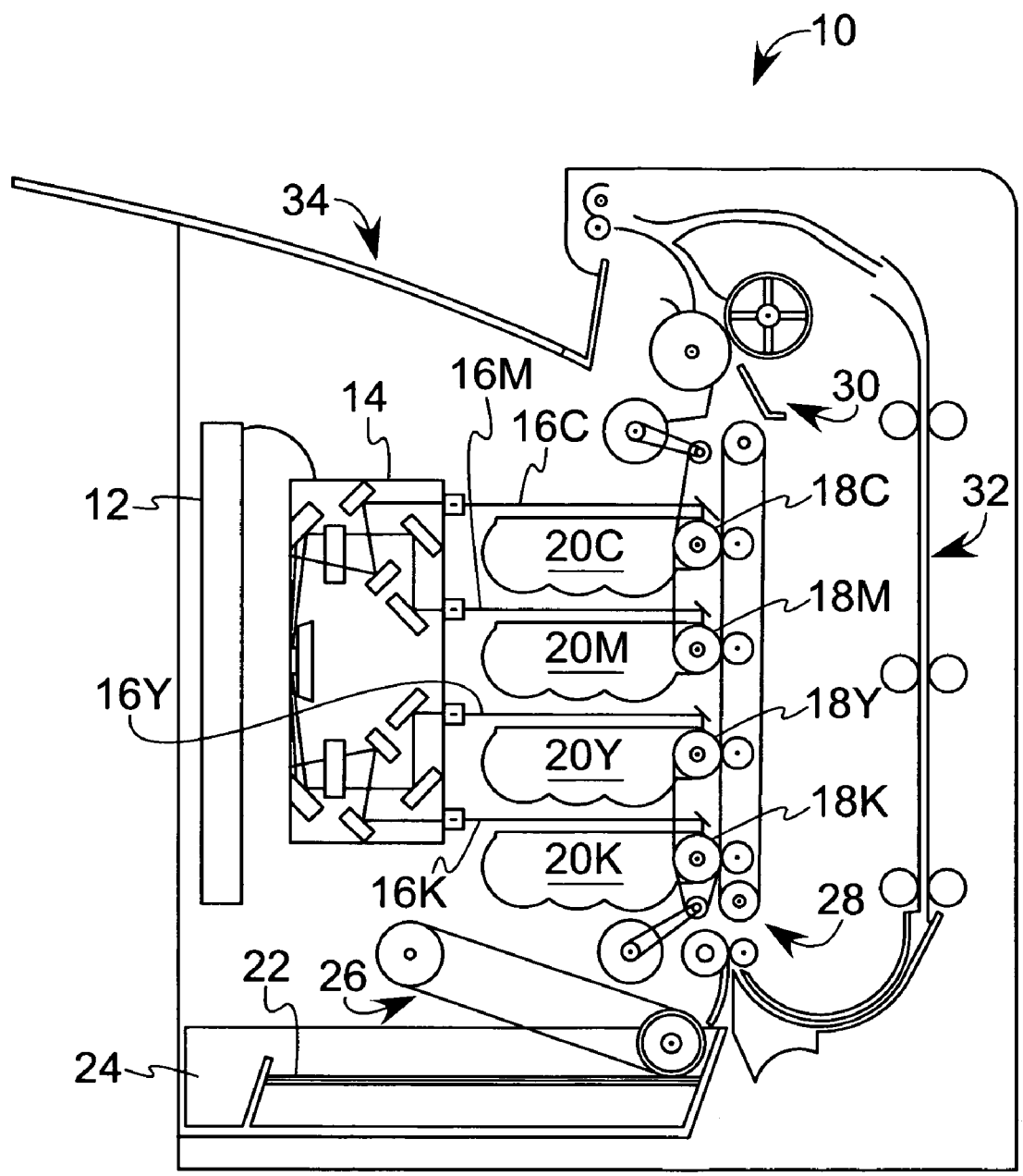
FIG. 1 is a schematic view of an exemplary electrophotographic imaging apparatus implemented as a color laser printer.

Referring now to the drawings, and particularly to FIG. 1, an exemplary apparatus, a color laser printer as shown, is indicated generally by the reference numeral 10. An image to be printed is electronically transmitted to a main system controller 12 by an external device (not shown). The main system controller 12 includes system memory, one or more processors, and other software and/or hardware logic necessary to control the functions of electrophotographic imaging including the implementation of scan path compensation as set out in greater detail herein. For color operation, the image to be printed is de-constructed into four bitmap images corresponding to the cyan, yellow, magenta and black (CYMK) image planes, e.g., by the main system controller 12 or by the external device.

The main system controller 12 initiates an imaging operation whereby a printhead 14 outputs first, second, third and fourth modulated light beams 16K, 16Y, 16M and 16C respectively. The first modulated light beam 16K forms a latent image on a photoconductive drum 18K of a first image forming station 20K based upon image data corresponding to the black image plane. The second modulated light beam 16Y forms a latent image on a photoconductive drum 18Y of a second image forming station 20Y based upon image data corresponding to the yellow image plane. The third modulated light beam 16M forms a latent image on a photoconductive drum 18M of a third image forming station 20M based upon image data corresponding to the magenta image plane. Similarly, the fourth modulated light beam 16C forms a latent image on a photoconductive drum 18C of a fourth image forming station 20C based upon image data corresponding to the cyan image plane. During the imaging operation, each modulated light beam 16K, 16Y, 16M, 16C sweeps across its corresponding photoconductive drum 18K, 18Y, 18M and 18C in a scan direction that is perpendicular to the plane of FIG. 1.

The main system controller 12 also coordinates the timing of a printing operation to correspond with the imaging operation, whereby a top sheet 22 of a stack of media is picked up from a media tray 24 by a pick mechanism 26 and is delivered to a media transport belt 28. The media transport belt 28 carries the sheet 22 past each of the four image forming stations 20K, 20Y, 20M and 20C, which apply toner to the sheet 22 in patterns corresponding to the latent images written to their associated photoconductive drums 18K, 18Y, 18M and 18C. The media transport belt 28 then carries the sheet 22 with the toned mono or composite color image registered thereon to a fuser assembly 30. The fuser assembly 30 includes a nip that applies heat and pressure that adheres the toned mono or composite color image to the sheet 22. Upon exiting the fuser assembly 30, the sheet 22 is either fed into a duplexing path 32 for printing on a second surface thereof, or the sheet 22 is ejected from the apparatus 10 to an output tray 34.

The above-described apparatus 10 is merely illustrative and other device configurations may alternatively be implemented. For example, the photoconductive drums 18K, 18Y, 18M and 18C may be replaced with a photoconductive belt or other photoconductive surfaces. Moreover, the photoconductive surface(s) may transfer the toned image to an intermediate device such as an electrically conductive intermediate transport belt that subsequently carries the toned image to the sheet 22. Still further, a single photoconductive surface may be used to image each color image plane in sequential processing steps. Also, while a single printhead 14 is illustrated, a separate printhead may alternatively be provided for each image forming station 20K, 20Y, 20M and 20C.

An Exemplary Printhead

Figure 2:
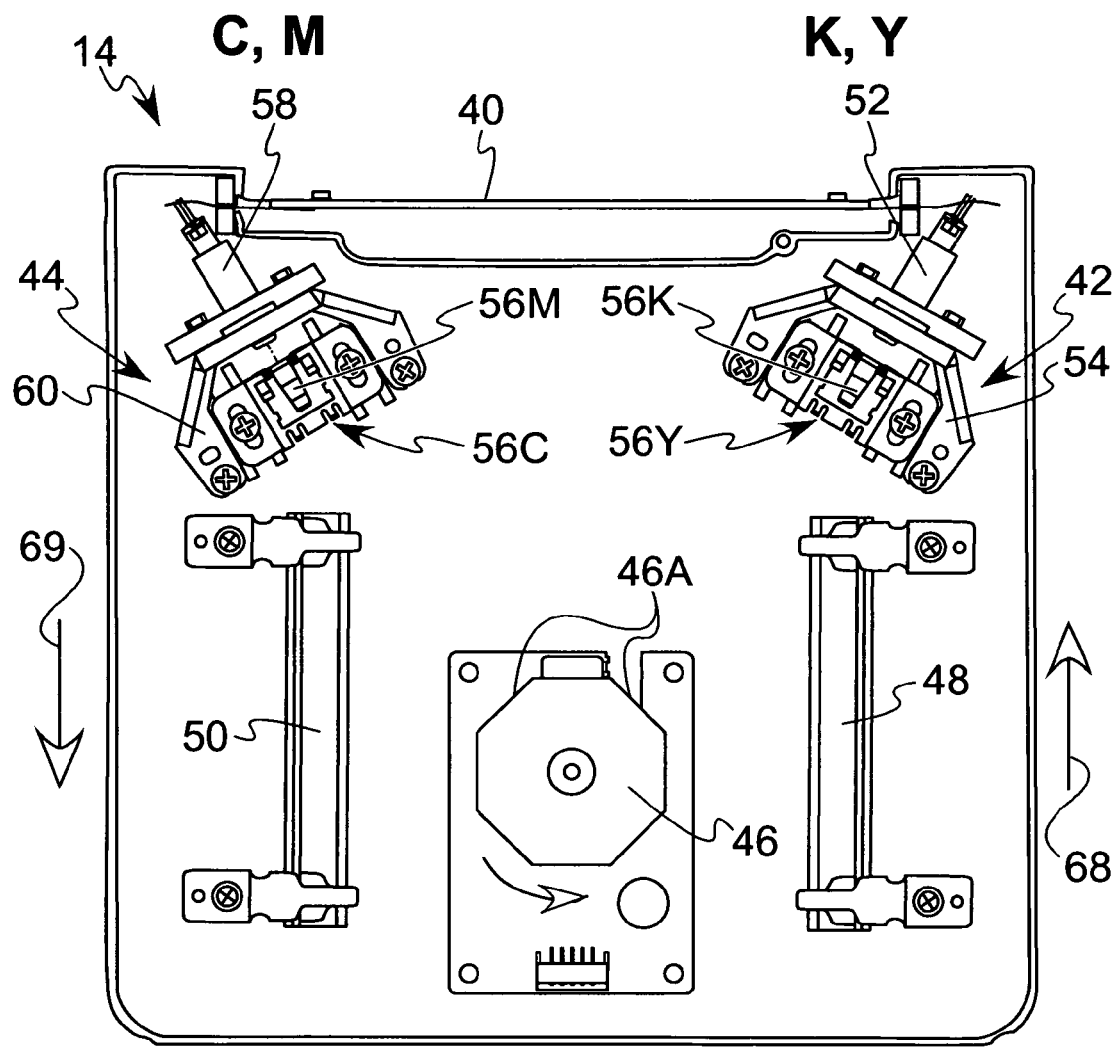
FIG. 2 is a top view of a printhead illustrating an exemplary arrangement of light sources with respect to a polygon mirror.

Referring to FIG. 2, the printhead 14 includes generally, printhead circuitry 40, first and second pre-scan assemblies 42, 44, a rotating polygon mirror 46, which is also referred to herein as a scanner, and first and second fold-down mirrors 48, 50. The printhead circuitry 40 is communicably coupled to the controller 12 for exchange of image data and control data between the printhead 14 and the controller 12. The first pre-scan assembly 42 comprises a first light assembly 52 and a first pre-scan optical system 54. The first light assembly 52 comprises a first pair of light sources including a first light source 56K that is associated with the black image plane, and a second light source 56Y that is associated with the yellow image plane. Similarly, the second pre-scan assembly 44 comprises a second light assembly 58 and a second pre-scan optical system 60. The second light assembly 58 comprises a second pair of light sources including a third light source 56M that is associated with the magenta image plane and a fourth light source 56C that is associated with the cyan image plane. Each of the first, second, third and fourth light sources 56K, 56Y, 56M and 56C, which may each be implemented using a laser diode or other suitable light source, are coupled to associated driver circuits on the printhead circuitry 40.

During an imaging operation, each light source 56K, 56Y, 56M and 56C is driven to emit a modulated beam 16K, 16Y, 16M and 16C corresponding to its associated one of the CYMK image data, which is communicated from the controller 12 to the associated driver circuits on the printhead circuitry 40. The first and second pre-scan optical systems 54, 60 each comprise one or more collimating lenses, pre-scan lenses and other optical elements as the specific implementation requires to direct and focus each of the modulated beams 16K, 16Y, 16M and 16C towards the polygon mirror 46.

The rotating polygonal mirror 46 includes a plurality of facets 46A, e.g., 8 facets, and is controlled by the controller 12 via the printhead circuitry 40 to rotate at a fixed rotational velocity ($\omega$) during imaging operations. The rotational velocity ($\omega$) of the polygon mirror 46 does not vary as a function of line length or user registration settings. Rather, line length and line linearity are controlled electronically as will be described in greater detail below. The first and second pre-scan assemblies 42, 44 are positioned generally to one side of the printhead 14 and are spaced apart from one another, e.g., by an angle of approximately 120 degrees relative to the polygon mirror 46. Moreover, the first and second light assemblies 52, 58 are arranged such that the first and second light beams 56K, 56Y emitted from the first light assembly 52 are directed at a first facet position of the polygon mirror 46 and the third and fourth light beams 56M, 56C emitted from the second light assembly 58 are directed at a second facet position of the polygon mirror 46, which is different from the first facet position.

Figure 3:
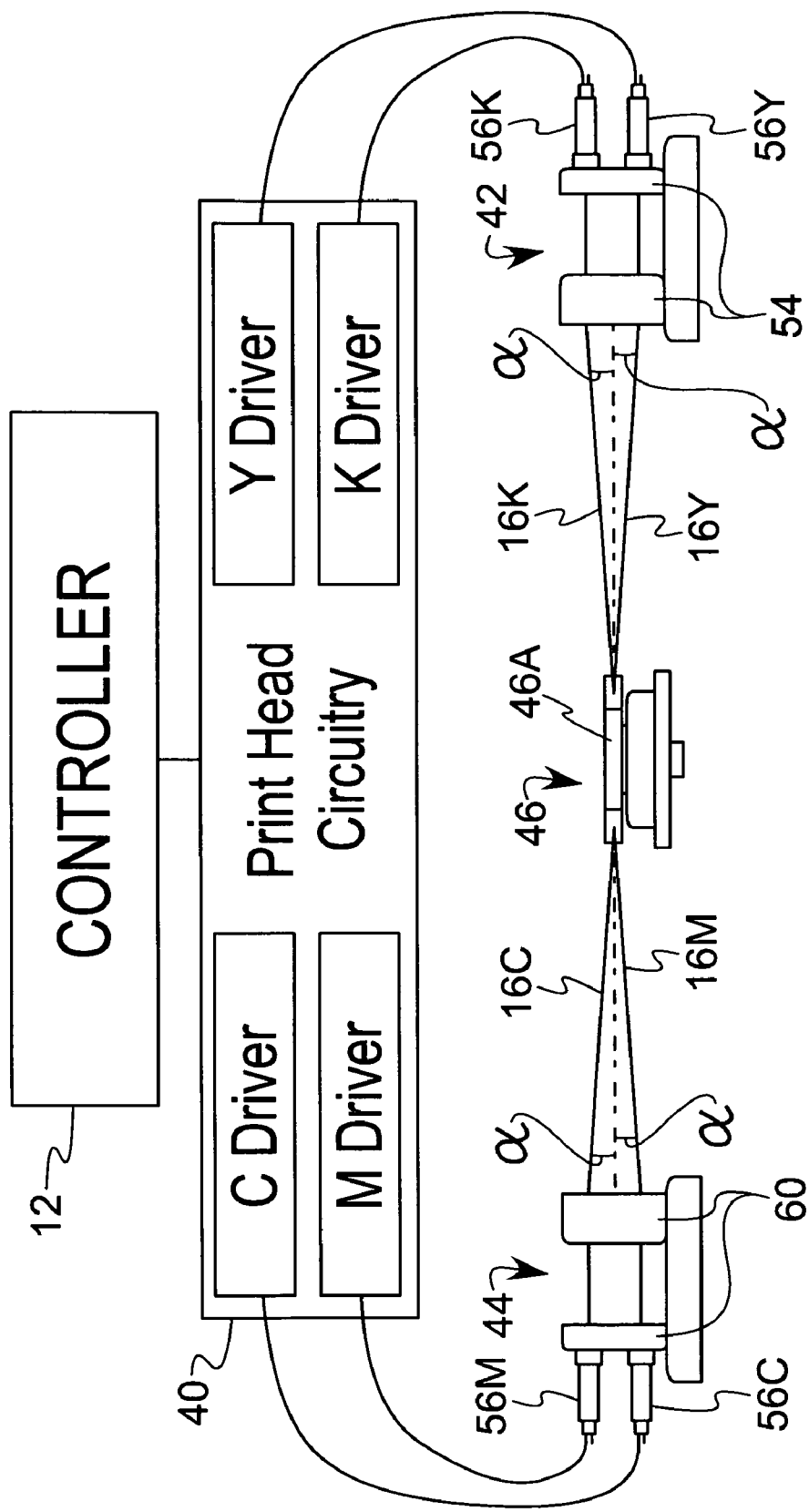
FIG. 3 is a schematic representation of the light sources and polygon mirror of FIG. 2, illustrating exemplary pre-scan optics and corresponding pre-scan beam paths.

With reference to FIG. 3, in one exemplary arrangement, the first and second pre-scan assemblies 42, 44 are arranged such that the first and second pairs of light sources 56K, 56Y are each arranged in a plane (vertically as shown) that is perpendicular to the rotational plane of the polygon mirror 46 (horizontal as shown). Moreover, the first pre-scan optical system 54 directs the first and second light beams 16K, 16Y towards the first common facet position of the polygon mirror 46 at an angle relative to one another, e.g., a nominal 6 degree angle, which is centered relative to the rotational plane of the polygon mirror 46. Thus each of the beams 16K, 16Y is three degrees relative to the rotational plane of the polygon mirror 46. Other angles may alternatively be implemented, as designated by the angle reference $\alpha$. The first and second light beams 16K, 16Y need not converge at a single point, but rather may be spaced from one another when striking the first common facet position.

Similarly, the second pre-scan optical system 44 directs the third and fourth light beams 16M, 16C towards the second common facet position of the polygon mirror 46 at an angle relative to one another, e.g., a nominal 6 degree angle, which is centered relative to the rotational plane of the polygon mirror 46. Thus each of the beams 16M, 16C is three degrees relative to the rotational plane of the polygon mirror 46. Other angles may alternatively be implemented, as also designated by the angle reference $\alpha$. The third and fourth light beams 16M, 16C likewise need not converge at a single point, but rather may be spaced from one another when striking the second common facet position. Further, other printhead arrangements may alternatively be implemented, including the use of different optical element and light source arrangements.

Referring back to FIG. 2, as the polygonal mirror 46 rotates, the first, second, third and fourth light beams 16K, 16Y, 16M and 16C will strike each facet 46A such that at any given point of rotation of the polygon mirror 46, the first and second light beams 16K, 16Y strike a different facet from the third and fourth light beams 16M, 16C. Moreover, for each facet 46A in the rotation of the polygon mirror 46, the first and second light beams 16K, 16Y will sweep across the first fold-down mirror 48 generally in a first scan direction as indicated by the first directional arrow 68. Likewise, the third and fourth beams 16M, 16C will sweep across the second fold-down mirror 50 in a second scan direction that is generally opposite of the first scan direction as indicated by the second directional arrow 69. As such, the scan direction of the first and second beams 16K, 16Y will be in opposite direction compared to the third and fourth beams 16M, 16C.

An Exemplary Post-Scan Optical System

Figure 4:
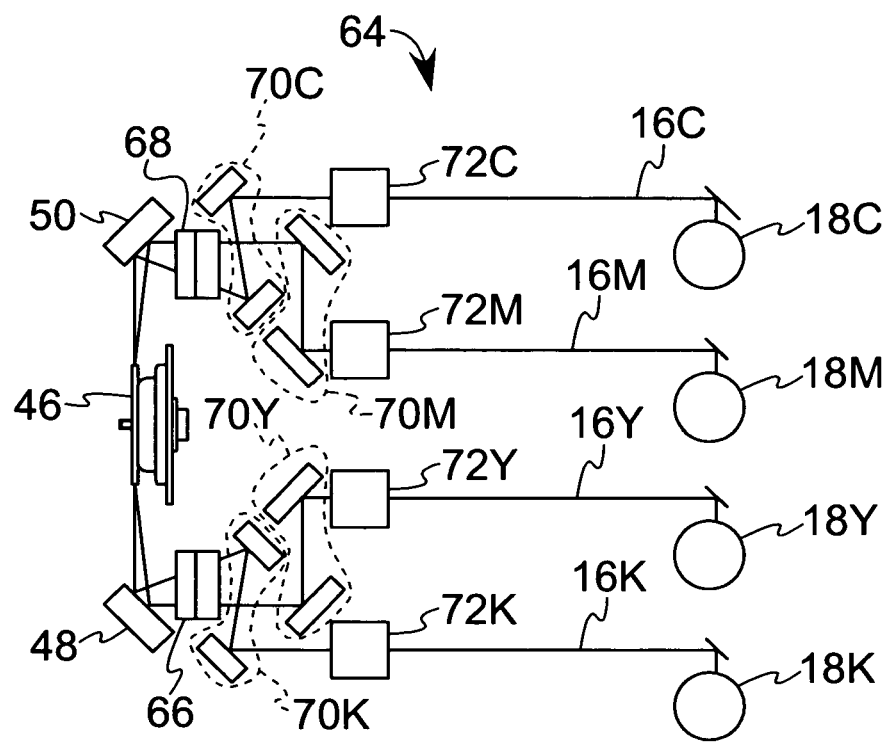
FIG. 4 is a schematic representation of an exemplary post-scan optical system for the apparatus of FIG. 1.

With reference to FIG. 4, an exemplary post scan optical system 64 is illustrated for the apparatus shown in FIG. 1. The post-scan optical system 64 includes generally, first and second common lenses 66, 68, first, second, third and fourth optical pick off device pairs 70K, 70Y, 70M and 70C, and first, second, third and fourth final correction lenses 72K, 72Y, 72M and 72C. The first and second light beams 16K, 16Y are reflected by the first fold-down mirror 48 through the first common lens 66. Similarly, the third and fourth beams 16M, 16C are reflected by the second fold-down mirror 50 through the second common lens 68. The first and second common lenses 66, 68 focus each of their associated pair of beams in the scan direction and may comprise, for example, an F1 lens.

The first light beam 16K is split off after the first common lens 66 by the first optical pick off device pair 70K and is coupled through the first final correction lens 72K to the first photoconductive drum 18K. The second light beam 16Y is split off after the first common lens 66 by the second optical pick off device pair 70Y and is coupled through the second final correction lens 72Y to the second photoconductive drum 18Y. Similarly, the third light beam 16M is split off after the second common lens 68 by the third optical pick off device pair 70M and is coupled through the third final correction lens 72M to the third photoconductive drum 18M and the fourth light beam 16C is split off after the second common lens 68 by the fourth optical pick of device pair 70C and is coupled through the fourth final correction lens 72C to the fourth photoconductive drum 18C. The first, second, third and fourth final correction lenses 72K, 72Y, 72M and 72C may comprise for example, an F2 lens or other lens arrangement that provides process direction focus and/or correction for facet variations.

Synchronization System

Figure 5:
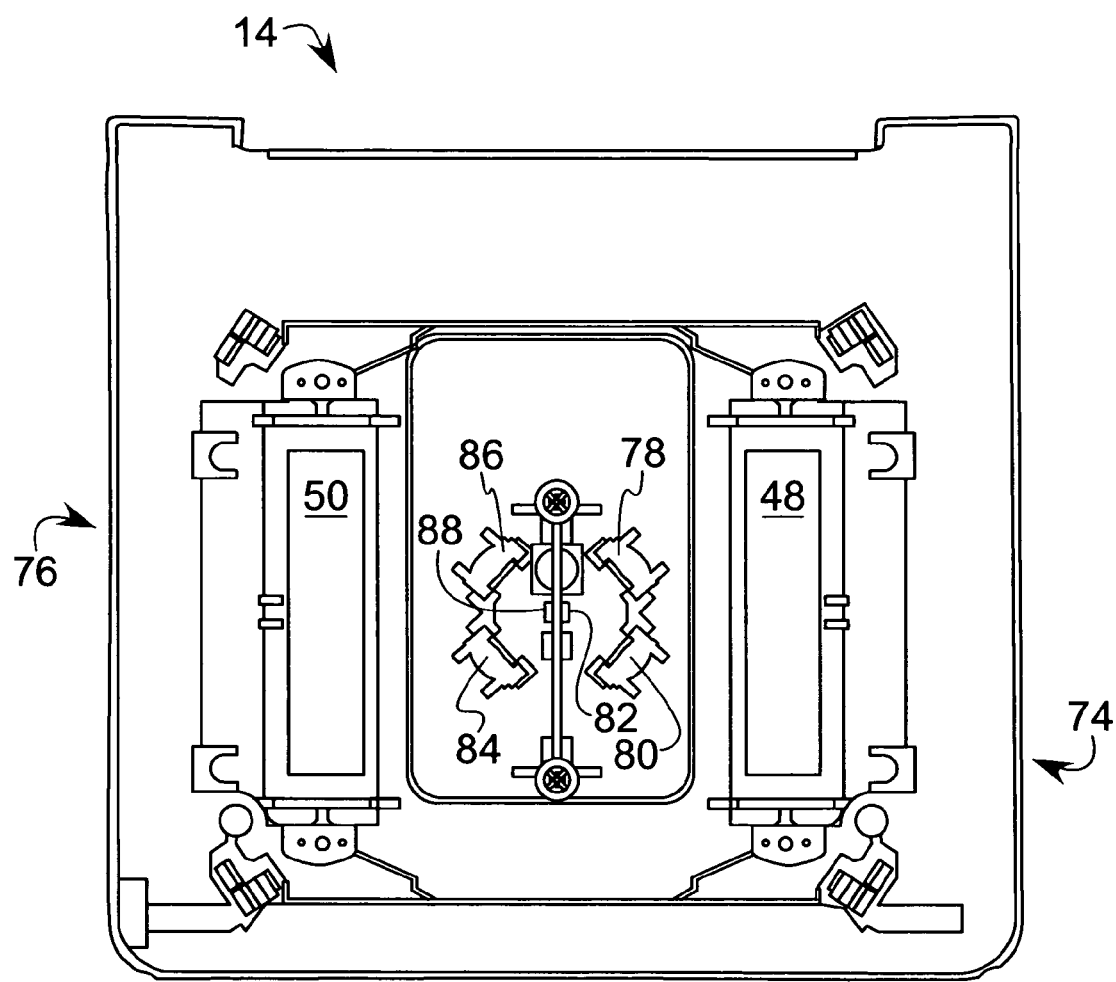
FIG. 5 is a bottom view of the exemplary printhead shown in FIG. 2.

Referring to FIG. 5, a bottom view of the printhead 14 is illustrated. As shown, the printhead 14 further comprises first and second synchronization systems 74, 76. The first synchronization system 74 comprises first and second collection lenses 78, 80 that are each directed towards a first sensor 82. Similarly, the second synchronization system 76 comprises third and fourth collection lenses 84, 86 that are each directed towards a second sensor 88. The first and second sensors 82, 88 are coupled to the processor 12 via the printhead electronics circuitry 40 for suitable processing as described in further detail below. The first and second sensors 82, 88 may be any suitable detector, an example of which is a positive-intrinsic-negative (PIN) diode.

Figure 6:
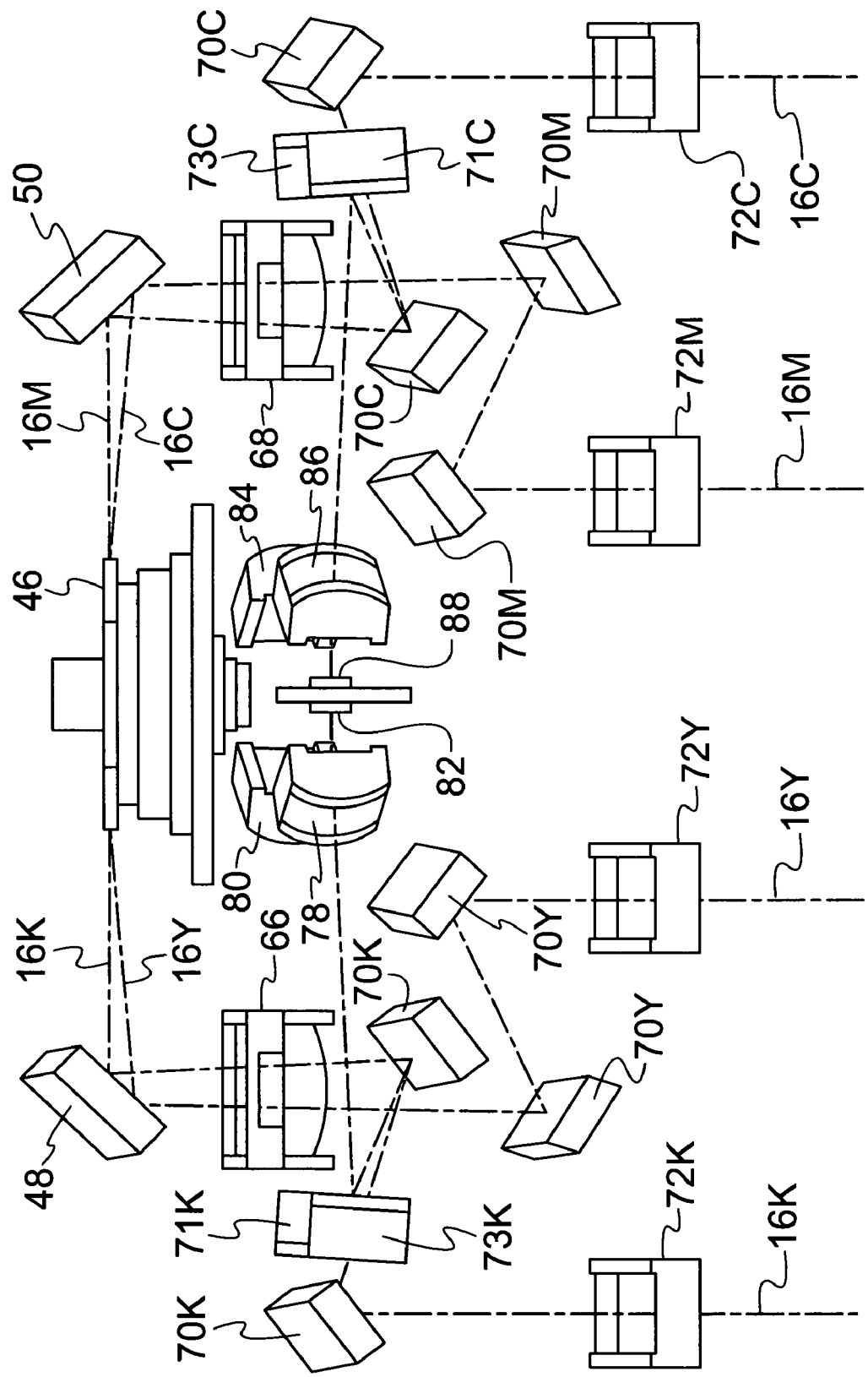
FIG. 6 is an illustration of portions of the printhead and post scan optical system with the printhead housing cut away to illustrate the relationship between the printhead, post-scan optics and start of scan and end of scan sensors.

With reference to FIG. 6, the post scan optical system 64 further includes a first pair start of scan pick off mirror 71K, a first pair end of scan pick off mirror 73K, a second pair start of scan pick of mirror 71C and a second pair end of scan pick off mirror 73C. The first pair start of scan pick off mirror 71K is mounted in the printhead housing such that when the first light beam 16K reaches a start of scan location along its scan path, e.g., at the beginning of a sweep for a given facet of rotation, the first beam 16K strikes the first pair start of scan mirror 71K, is picked off and is directed through the first collection lens 78 to the first sensor 82, which is mounted to the bottom of the printhead 14. As illustrated, the pick off occurs after the first light beam 16K has passed through the first common lens 66. The timing of this event, i.e., the detection of the first beam 16K by the first sensor 82, is referred to hereinafter as Start of Scan (SOS) and designates a start of a scanning operation for each of the first and second light beams 16K, 16Y.

Similarly, the first light beam 16K is picked off by the mirror 73K and is directed through the second collection lens 80 to the first sensor 82 generally towards the end of a sweep for a given facet of rotation. The pick off also occurs after the first light beam 16K has passed through the first common lens 66. The timing of this event is referred to hereinafter as End of Scan (EOS) and designates an end of a scanning operation for each of the first and second light beams 16K, 16Y. Alternatively, the second light beam 16Y may have been used for SOS and EOS detection.

In an analogous manner, the second pair start of scan pick off mirror 71C is mounted in the printhead housing such that when the fourth light beam 16C reaches a start of scan location along its scan path, e.g., at the beginning of a sweep for a given facet of rotation, the fourth beam 16C strikes the second pair start of scan mirror 71C, is picked off and is directed through the third collection lens 84 to the second sensor 88. As illustrated, the pick off occurs after the fourth light beam 16C has passed through the second common lens 68. The timing of this event, i.e., the detection of the fourth beam 16C by the second sensor 88, is also referred to hereinafter as Start of Scan (SOS) and designates a start of a scanning operation for each of the third and fourth light beams 16M, 16C. Similarly, the fourth light beam 16C is picked off by the mirror 73C and is directed through the fourth collection lens 86 to the second sensor 88 generally towards the end of a sweep for a given facet of rotation. The pick off also occurs after the fourth light beam 16C has passed through the second common lens 68. The timing of this event is referred to hereinafter as End of Scan (EOS) and designates an end of a scanning operation for each of the third and fourth light beams 16M, 16C. Alternatively, the third light beam 16M may have been used for SOS and EOS detection.

The selected beams used for SOS and EOS detection by the synchronization system may be rotated and/or highly astigmatic. As a result, the collection lenses 78, 80, 84, 86 may be sphero-cylindrical or implement other suitable arrangements to focus their associated beam, which may be much narrower in the scan direction than in the cross-scan direction, to a spot for striking its corresponding sensor 82, 88. Moreover, the collection lenses 78, 80, 84, 86 may be rotated individually relative to the scan plane to match the orientation of the associated light beam. Other suitable arrangements of sensors and optical devices may alternatively be implemented so as to detect the SOS and EOS of the light beams.

Although FIGS. 1-6 illustrate an exemplary multi-beam printhead and corresponding apparatus, other printhead configurations may alternatively implemented. For example, an apparatus may implement a different multi-beam printhead and/or optical system structure, or the apparatus may include a plurality of separate printheads, e.g., one printhead associated with each of the cyan, magenta, yellow and black image planes. The SOS/EOS can be detected in other suitable ways, e.g., two sensors may be used including a first sensor for SOS and a separate sensor for EOS. Additionally, each light beam may process its own SOS and EOS signals. Still further, the SOS and EOS sensor(s) may be located in any suitable locations, including areas outside of the printhead, e.g., adjacent to a corresponding photoconductive surface, etc.

The Imaging Operation

The timing that determines when each laser beam 16K, 16Y, 16M and 16C is to begin creating a latent image upon its associated PC drum 18K, 18Y, 18M and 18C is initially derived by an associated vertical synchronization (Vsync) signal. To determine when to trigger a corresponding Vsync signal, i.e., indicate the start of printing at the top of a new sheet 22, a sensor, e.g., a bump-align or paper path sensor detects the presence of a sheet passing through the apparatus 10. The distance between the sensor and each image forming stations 20K, 20Y, 20M and 20C is known, and the speed of the media transport belt 28 is known, thus the controller 12 may compute the image point to transfer point for each color image plane.

For example, each time a new facet of the rotating polygonal mirror 46 intercepts its two laser beams, the associated SOS/EOS sensor generates an H-sync (SOS) signal in response to being activated by a designated one of the two laser beams. The controller 12 may thus convert the time of travel of the sheet 22 from detection of a corresponding bump align signal to an associated one of the image forming stations 20K, 20Y, 20M and 20C into a number of scan lines for synchronization. That is, the Vsync signal is determined as a count of Hsync signals from the detection of the bump align signal. Thus, two of the color image planes, e.g., the black and yellow image planes, each count down a unique number of H-sync signals as detected by the first sensor 82 from detection of the sheet 22 along the paper path before triggering their corresponding Vsync signal. Similarly, the remainder two image planes, e.g., magenta and cyan, each count down a unique number of H-sync signals as detected by the second sensor 88 before triggering their corresponding Vsync signal.

Color to Color Registration

The margin and line length of each of the CYMK image planes should be registered with respect to the remainder ones of the CYMK image planes in order to form a high quality composite toned image on the sheet 22. In the exemplary printhead 14, the first and second light beams 16K, 16Y sweep in a first direction and the third and fourth light beams 16M, 16C sweep in a second direction. Thus, the margin characteristic for suitable registration of the CYMK image planes may include for example, the left margin for the beams that sweep left to right, and the right margin for the beams that sweep right to left. Additionally, the nominal line length of each of the CYMK color image planes should be kept substantially the same.

As noted in greater detail herein, the beam scan path of each color image plane can shift during normal operation due to one or more varying operating conditions, e.g., due to changes in the indices of refraction of optical components such as lens elements in the post scan optics 62 caused by thermally induced expansion and contraction of those lens elements. For example, referring to FIG. 7, a simplified, exemplary plot 90 illustrates scanner angle, i.e., a measure of the rotation of a polygon mirror, as a function of scan direction position for an exemplary light beam scan path. As the plot 90 demonstrates, the corresponding curve shifts as a function of temperature. As shown, the slope of the curve increases as temperature increases. Thus, for example, a line length will increase as temperature increases, and the line length will decrease as temperature decreases.

Method of Performing Time Varying Scan Path Compensation

Figure 8:
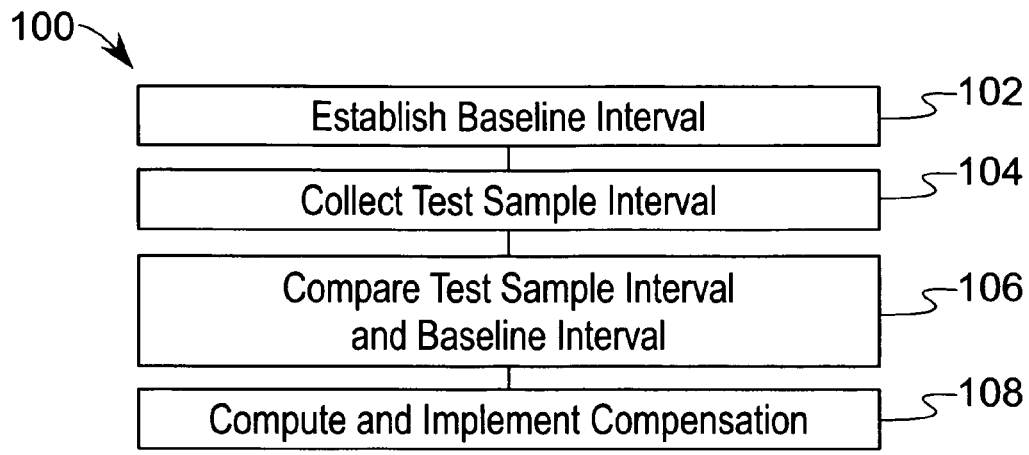
FIG. 8 is a flow chart of a method of compensating for time varying scan path errors.

Referring to FIG. 8, a flow chart 100 illustrates a method of performing registration compensation due to time varying light beam scan path changes in a multi-beam apparatus. The method comprises establishing at a first time, a baseline scan interval (designated $Sample_{baseline}$) at 102 by measuring and recording a representation of an interval between a first reference point along a scan line and a second reference point along a scan line. The baseline scan interval may be expressed in terms of scanner angle, distance, time or other suitable units of measure. The baseline scan interval may be determined and stored in memory during a manufacturing process, during a factory or operator registration process, or other time where such a measurement is convenient. Also, the baseline scan interval may be recorded onto a non-volatile memory device on the printhead itself, or the baseline scan interval may be recorded elsewhere in the apparatus accessible to the controller 12.

A test scan interval (designated $Sample_{current}$) is recorded at 104, e.g., at some time after the baseline scan interval has been recorded, by measuring and recording a representation of the interval between the first reference point and the second reference point along the scan line. A comparison is performed of the test scan interval relative to the baseline scan interval at 106, and scan line compensation values are computed at 108. The computed compensation values are then used by the controller 12 to adjust the manner in which the image data is written to the corresponding photoconductive surface to effect registration compensation.

Determining a Scan Interval for Computing Scan Path Compensation

As best illustrated with reference to FIG. 6, the SOS and EOS signals of each of the first and second synchronization systems 72, 74 are detected after the associated beams pass through their corresponding shared lens 66, 68. Further, as noted in the discussion of the exemplary post scan optical system 64 discussed with reference to FIG. 4, the first shared lens 66 performs most of the scan direction correction for the first and second light beams 16K, 16Y, and the second shared lens 68 performs most of the scan direction correction for the third and fourth light beams 16M, 16C. The first and second shared lenses 66, 68 also account for a significant amount of the temperature-related changes in the light beam scan path. As such, the SOS-EOS interval correlates to temperature induced changes in the light beam scan paths and may be used to define the interval between the first and second reference points along a scan line in the method of FIG. 8. Other printhead arrangements and optical systems may have different lenses or lens combinations that account for temperature induced scan path errors differently to that described above. Such alternative structures may affect the degree to which the scan interval correlates to temperature and/or the manner in which the scan interval is selected. However, any reasonable and determinable interval may be used.

For example, the baseline scan interval may be determined during a first calibration process, e.g., during manufacturing or during a factory or operator initiated registration process, by identifying a first event indicating an SOS, identifying a second event indicating an EOS and by computing the appropriate interval between the SOS and EOS signals. The SOS-EOS interval may be expressed as a function of time, distance, scanner angle or other suitable unit of measure.

Further, the baseline scan interval may be derived by measuring a baseline scan interval for each facet of a corresponding polygon mirror, and then by taking the average across all facets. As an example, an angle of rotation of the polygon mirror between SOS-EOS ($A_{SOS\_EOS}$) may be recorded for each facet of the polygon mirror 46. The scanner angle ($A_{SOS\_EOS}$) factors out variations in the rotational velocity ($\omega_{polygon}$) of the polygon mirror 46 and thus may be a convenient format for processing by the controller 12. For example, by knowing the time ($T_{SOS\_EOS}$) between SOS and EOS and by knowing a fixed rotational velocity ($\omega_{polygon}$) of the polygon mirror 46, the scanner angle ($A_{SOS\_EOS}$) may be computed according to the formula $A_{SOS\_EOS=TSOS\-EOS}*\omega_{polygon}$. The baseline scan interval Sample$_{baseline}$ is then computed as the average of the measured SOS-EOS scanner angle intervals ($A_{SOS\_EOS}$) across each of the facets. Still further, the baseline scan interval Sample$_{baseline}$ may be recorded as an average of multiple scanner angle intervals ($A_{SOS\_EOS}$) which may include one or more rotations of the polygon mirror 46.

For the apparatus 10 illustrated with reference to FIGS. 1-6, a first baseline scan interval may be recorded for the first pair of light beams as each of the first and second light beams 16K, 16Y share a common set of SOS and EOS timing signals from the first sensor 82. Similarly, a second baseline scan interval may be recorded for the second pair of light beams as each of the third and fourth light beams 16M, 16C share a common set of SOS and EOS timing signals from the second sensor 88 as described above with reference to FIGS. 5 and 6. However, depending upon the particular configuration of specific printhead or printheads in a particular apparatus, other baseline interval schemes may be implemented. Further, intervals other than SOS-EOS, e.g., printed line length, may alternatively be measured so long as the selected interval correlates to some degree to a change in at least one operating condition, e.g., temperature, sufficient to enable the controller 12 to perform corrections to the light beam scan paths. Moreover, other averaging or statistically manipulated representations may alternatively be performed to derive the baseline scan interval.

At a second time, which may be implemented for example, during routine operation of the printer, the test sample interval Sample$_{current}$ is collected, e.g., by measuring and recording an average of the scanner angle ($A_{SOS\_EOS}$) across all facets of the corresponding polygon mirror 46. Thus, a "sample" in the specific context of the exemplary apparatus 10 described with reference to FIGS. 1-6, may be referred to generally to designate an average of the SOS-EOS interval for all facets of the polygon mirror 46 for each of the two pairs of light beams. That is, two SOS-EOS interval measurements are taken per facet, one measurement for the first pair of beams 16K, 16Y and a separate measurement for the second pair of beams 16M, 16C.

Moreover, for the polygon mirror shown in FIG. 2, there are a total of 8 facets, so each "sample" or set of two averaged values, comprises 16 total measurements including 8 measurements averaged together for each of the first pair of beams 16K, 16Y and the second pair of beams 16M, 16C. Other characterizations of the baseline interval and test sample interval may alternatively be used, depending upon the specific application and the specific factors that account for scan path errors that vary as a result of changes in operating conditions, e.g., temperature induced scan path errors.

The test sample interval Sample$_{current}$ may also be computed as a moving average of interval samples. That is, periodically, a sample of SOS-EOS timing may be performed and a moving average filter may be computed from a predetermined number of previously determined samples. The apparatus may periodically take a sample at predetermined events such as at the beginning of every printed page. Another exemplary event that may trigger a sample is where a print job takes longer than a predetermined amount of time, such as over 10 minutes, etc. The controller 12 may then use a moving average of the last n, e.g., 5 collected samples, when performing scan path compensation. Moreover, the controller 12 may opt to perform selective compensation based upon the event that triggered the sample collection. For example, the controller 12 may perform line length, margin and process direction compensation at the beginning of a print job. However, if the print job lasts more than a predetermined time, e.g., 10 minutes, then only the margin and line length compensations may be performed. Other selective control operations may alternatively be implemented.

Still further, the controller 12 may store a number of samples, e.g., 20, but use only the most recent, e.g., 5 samples, for the moving average filter. Since the events that trigger the sampling process may be dynamic, the controller 12 may also store a time stamp with each sample, and only use samples that are within a predetermined age. For example, the controller 12 may throw away samples that are older than 10 minutes or other reasonable age.

Figure 9:
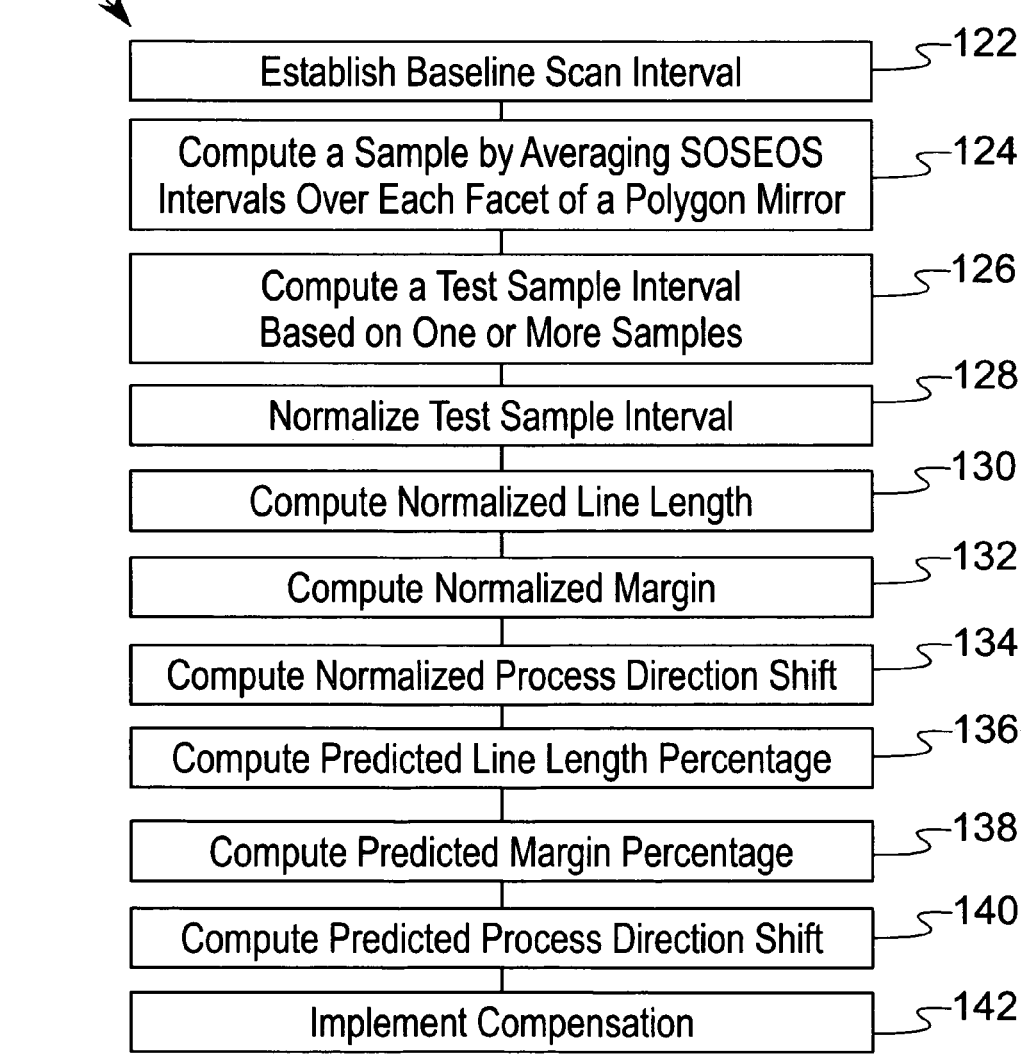
FIG. 9 is a flow chart of another method of compensating for time varying scan path errors.

Referring to FIG. 9, a flow chart 120 illustrates an exemplary approach for the computing scan path compensation data. A baseline scan interval is determined and recorded at 122, e.g., such as by recording an average interval scanner angle ($A_{SOS\_EOS}$) across all facets of the corresponding polygon mirror, e.g., during manufacturing, during a factory or operator initiated registration process or other suitable time for calibrating the device 10 as noted above. Periodically, such as at the occurrence of predetermined events during normal operation, a sample interval is recorded and stored at 124, e.g., based upon an average interval scanner angle ($A_{SOS\_EOS}$) across all facets of the corresponding polygon mirror. An optional time stamp or other identifying data may also be stored with each collected sample.

At a time when a scan path compensation is to be computed, a moving average test sample interval is obtained or updated at 126. Keeping with the example described above, each sample is an average over each of the m facets for each pair of beams. In the above example, there are 8 facets on the polygon mirror. The test sample interval is a moving average that is computed for the last n samples, where n comprises the size of the moving average filter, 5 in the above example. That is:

$$\text{AVG\_SOS-EOS\_Interval} = \frac{\sum_{i=1}^{m} \text{SOS\_EOS\_Interval}_i}{m}$$

$$\text{Sample}_{\text{current\_avg}} = \frac{\sum_{i=1}^{n} \text{AVG\_SOS\_EOS\_Interval}_i}{n}$$

A comparison is then performed between the baseline scan interval Sample$_{baseline}$ and the computed test sample interval Sample$_{current\_avg}$ to determine the appropriate compensation values. One exemplary approach to perform the comparison is to determine a predicted change in the line length, margin and/or process direction shift that occurs as a result of changes in the SOS-EOS interval.

A normalized test sample interval is computed at 128. One exemplary approach to computing the normalized test sample interval is by dividing the computed test sample interval by the baseline interval.

$$Sample_{norm} = \frac{Sample_{current\_avg}}{Sample_{baseline}}$$

With the normalized test sample interval computed, a normalized line length is computed at 130 and optionally, a normalized margin is computed at 132 and/or a normalized process direction shift is computed at 134. With a normalized line length computed, a predicted line length change can be computed at 136, e.g., expressed as a percent of a baseline line length. Similarly, a predicted margin change may be computed at 138 and a predicted process direction shift may be computed at 140. Scan path compensation values are then computed at 142 based upon the predicted line length change and optionally the predicted margin change and/or process direction shift.

One exemplary approach to computing normalized line length, margin and/or process shift is to consider previously determined characterizing data that is stored in a memory device on the apparatus.

Method of Constructing Previously Determined Characterizing Data

Figure 10:
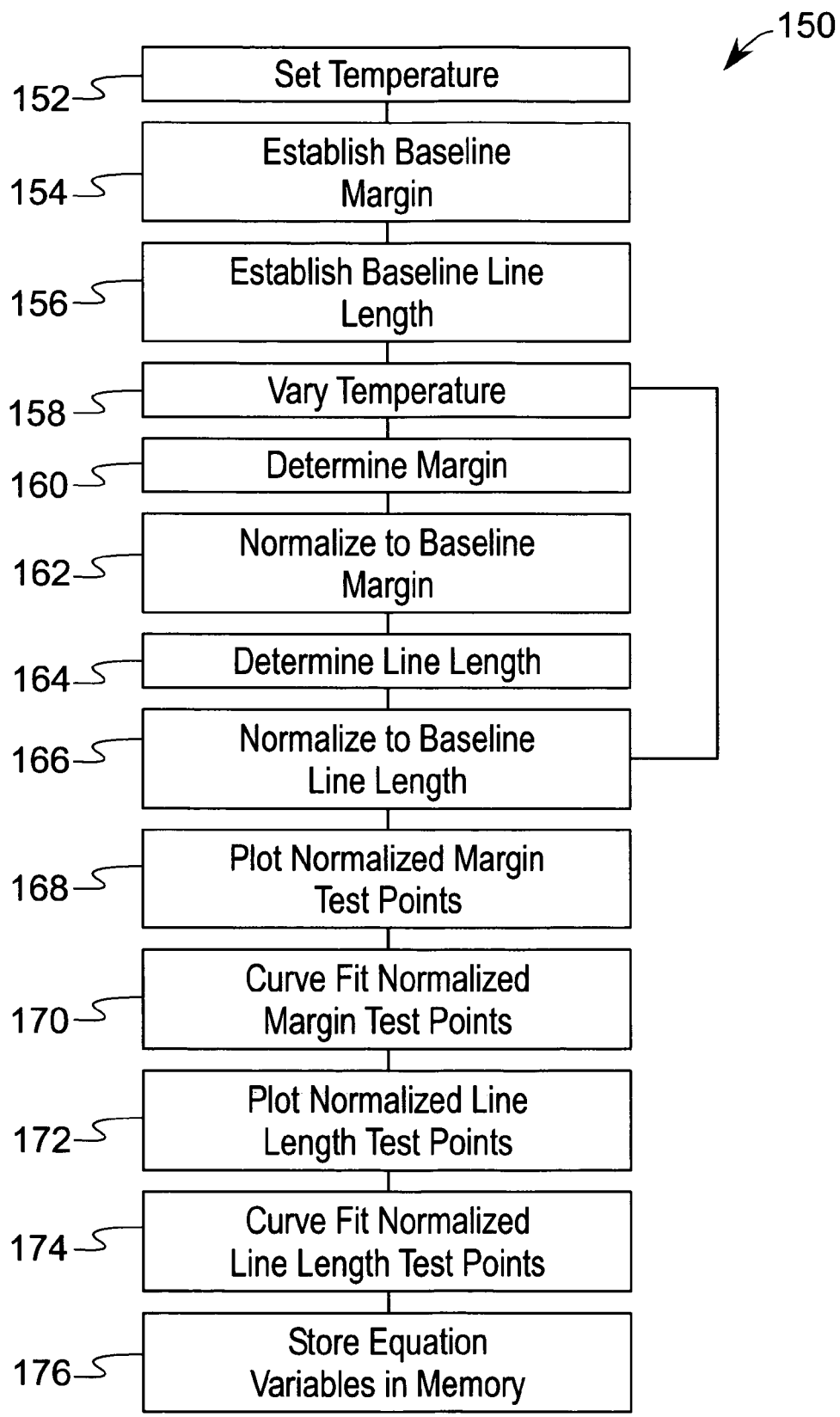
FIG. 10 is a flow chart of a method for characterizing scan path changes as a function of temperature.

Previously determined characterizing data may be unique to the particular printhead or the previously determined characterizing data may be derived for a class of similar printheads, e.g., based on a plurality of test printheads in the same product or product line, manufacturing batch or other grouping. For example, referring to FIG. 10, a method illustrates one exemplary way of generating characterizing data for line length and margin as a function of one exemplary operating condition, a variation in temperature.

A temperature is set at 152. This may be performed by measuring the current temperature within a test apparatus or by controlling the temperature within the test apparatus to a predetermined value. A printhead under test may alternatively be placed in a test fixture or other testing arrangement, e.g., if it is impractical or undesirable to test the printhead and optical system in a representative apparatus housing. For example, a printhead may be placed in a test fixture that is positioned within a thermal oven or other structure capable of controllably modifying the temperature of the printhead within the test fixture.

Baseline margin data is then established at 154 at the temperature determined at 152. The margin for a scan line may be determined by the interval between a given SOS signal and the point where the first image data is written to a corresponding photoconductive drum, which is indicated for example, by a Det2Prt signal or other suitable detect-to-print value. Two convenient ways of considering a detect-to-print value are in terms of scanner angle ($A_{dtp}$) and time $T_{dtp}$. The detect-to-print angle ($A_{dtp}$) is the angle that the polygon rotates between the associated SOS signal and the corresponding Det2Prt signal for a given light beam and the detect-to-print-time is expressed as: $T_{dtp}=A_{dtp}/\omega_{polygon}$ where $\omega_{polygon}$ is presumed to be constant. In one exemplary implementation, the SOS-Det2Prt scanner angle and the corresponding scan direction distance (margin length) between the SOS and Det2Prt are measured at the set temperature. The baseline margin may alternatively be determined as an average of SOS-Det2Prt across all polygon facets.

A base line length is established at 156 at the temperature determined at 152. For example, in a manner analogous to that for the margin, the SOS-EOS scanner angle may be measured or computed as an average over all polygon facets. The SOS-EOS scanner angle (or average across all facets) and corresponding scan direction line length are recorded as the baseline line length. In this regard, the line length may be based upon any consistently used measure, such as SOS-EOS distance, the distance that defines a line on a printed page, or some other reasonable measure. In this example, the margin length and corresponding SOS-Det2Prt angle, and the line length and corresponding SOS-EOS angle serve as baselines to their characterizing data.

For example, a test fixture can be used, such as the test fixture described under the heading "Laser Beam Scan Path Test Device" as set out in U.S. patent application Ser. No. 10/808,043, entitled "Memory Device On Optical Scanner And Apparatus And Method For Storing Characterizing Information On The Memory Device" to the same assignee, the contents of which are incorporated by reference herein. Under this arrangement, the printhead under test is placed in a test fixture. The test fixture has a plurality of sensors, e.g., 15 sensors, which can be placed along the scan path of each beam 16K, 16Y, 16M, 16C. Thus, for each beam 16K, 16Y, 16M, 16C, there are fifteen sensor points, identified herein as $P_0$-$P_{14}$.

For purposes of simplifying the discussion herein, sensor point $P_0$ is positioned at the margin location, thus the margin length is a measure from a fixed reference point such as a predefined origin to a sensor located at sensor point $P_0$. The angle measurement for the margin can be determined based upon the time from the detection of an SOS signal to the time that a signal is generated by the sensor located at sensor point $P_0$ and the known rotational velocity of the polygon mirror 46 as set out above.

Similarly, the line length is defined for purposes of example as a measure of the scan direction distance between sensor points $P_0$-$P_{14}$. The angle measurement for the line length can be determined as the angle between sensor points $P_0$ and $P_{14}$, e.g., based upon a measurement of the time between detecting a first signal generated by the sensor at sensor point $P_0$ and a second signal generated by the sensor at sensor point $P_{14}$, and the known rotational velocity of the polygon mirror 46 as set out above.

The temperature is then varied by adjusting the temperature up or down to cause temperature induced scan path changes at 158. As will be described below, at the newly set temperature, the margin, e.g., as a measure of both scan direction length and angle, is determined at 160, and the determined margin measurements are normalized at 162 relative to the baseline margin measurements, which were determined at 154. The normalized margin values are stored as a normalized margin test point. Similarly, at the newly set temperature, the line length, e.g., as a measure of both scan direction line length and angle, is determined at 164 and the determined line length measurements are normalized relative to their baseline line length values at 166. The normalized line length values are stored as a normalized line length test point. The above process of varying the temperature and determining normalized margin and line length test points at 158 through 166 may be repeated multiple times to gather several test points at different temperatures.

The above process at 152 through 166 may be repeated for multiple printheads, e.g., by testing a plurality of printheads in their associated apparatus, by sequentially placing a plurality of printheads in a common test apparatus, or by placing one or more printheads in an external test fixture, depending upon the particular arrangement of the printhead and corresponding optical system. Further, the above process 152-166 may be repeated for each color image plane for multiple beam devices.

Keeping with the above example, the sensors located at sensor points $P_0$-$P_{14}$ may not physically move in the test device, e.g., as a function of temperature. However, the scan direction margin length and line length changes may be inferred by multiplying the measured margin and line length distances by a magnification factor derived from a change in their corresponding scanner angle at the new temperature $T_n$ compared to the corresponding angle measured at the initial temperature $T_0$ at step 152. For example:

$$\text{Margin\_Mag} = \frac{[ANGLE_{P0-SOS}]_{TempTn}}{[ANGLE_{P0-SOS}]_{TempT0}}$$

$$MarginLength_{TempTn} = \text{Margin\_Mag} * MeasuredMarginLength$$

$$\text{LineLength\_Mag} = \frac{[ANGLE_{P14-P0}]_{TempTn}}{[ANGLE_{P14-P14}]_{TempT0}}$$

$$LineLength_{TempTn} = \text{LineLength\_Mag} * MeasuredLineLength$$

In other words, a margin magnification (Margin_Mag) is computed by dividing the measured or computed margin angle ($[ANGLE_{P0-SOS}]_{TempTn}$) at the new temperature, e.g., the angle of polygon rotation between a signal generated by the SOS sensor and a signal generated by the sensor at sensor point $P_0$, by the corresponding measured or computed margin angle ($[ANGLE_{P0-SOS}]_{TempT0}$) at the baseline temperature. The margin length at the new temperature (M arginLength$_{TempTn}$) can then be inferred by multiplying the margin magnification (Margin_Mag) by the measured margin length (MeasuredMarginLength), e.g., a measurement of the scan direction distance between an arbitrary origin and the sensor at sensor point $P_0$.

Similarly, a line length magnification (LineLength_Mag) is computed by dividing the measured or computed line length angle ($[ANGLE_{P14-P0}]_{TempTn}$) at the new temperature, e.g., the angle of polygon rotation between a first signal generated by the sensor at sensor point $P_0$ and a second signal generated by the sensor at sensor point $P_{14}$, by the corresponding measured or computed line length angle ($[ANGLE_{P14-P0}]_{TempT0}$) at the baseline temperature. The line length at the new temperature (LineLength$_{TempTn}$) can then be inferred by multiplying the line length magnification (LineLength_Mag) by the measured line length (MeasuredLineLength), e.g., the measured scan direction distance between the sensor at sensor point $P_0$ and the sensor at sensor point $P_{14}$.

The margin length (M arginLength$_{TempTn}$) and associated margin angle ($[ANGLE_{P0-SOS}]_{TempTn}$) correspond to the margin determined at 160. Similarly, the line length (LineLength$_{TempTn}$) and associated line length angle ($[ANGLE_{P14-P0}]_{TempTn}$) correspond to the line length determined at 164.

Thus, the margin length and associated margin angle can be normalized at 162 as follows:

MarginLength$_{(normalized)}$=M arginLength$_{TempTn}$/MeasuredM arginLength

MarginAngle$_{(normalized)}$=$[ANGLE_{P0-SOS}]_{TempTn}$/$[ANGLE_{P0-SOS}]_{TempT0}$ Similarly, the line length and associated line length angle can be normalized at 166 as follows:

LineLength$_{(normalized)}$=LineLength$_{TempTn}$/MeasuredLineLength

LineLengthAngle$_{(normalized)}$=$[ANGLE_{P14-P0}]_{TempTn}$/$[ANGLE_{P14-P0}]_{TempT0}$ Any other suitable techniques can be utilized to determine the margin and line length test points however. For example, for each change in temperature or other suitable operating condition, actual measurements can be taken of the line length and/or margin, e.g., using printed test sheets or other suitable means.

The gathered margin test points for one or more printheads are plotted at 168 and curve fitted at 170, e.g., by plotting the various scanner angle values along the axis of abscissa and the length or scan direction distance along the axis of ordinate, and by performing a curve fitting operation on the plotted points. Any curve fitting techniques may be used. In one exemplary implementation, an equation may be derived based upon a linear curve fit in the slope-intercept form of a line y=mx+b.

Similarly, gathered line length test points for one or more printheads are plotted at 172 and curve fitted at 174, e.g., by plotting the various scanner angle values along the axis of abscissa and the length or scan direction distance along the axis of ordinate, and performing a curve fitting operation on the plotted line length points. Any curve fitting techniques may be used here as well, including for example, a linear curve fit in the slope-intercept form of a line y=mx+b. The determined equations for margin and line length are stored at 176. In the above example of using a linear model, this can be accomplished by storing the slope (det2prt_Slope) and intercept (det2prt_Intercept) variables for the margin and the slope (ll_Slope) and intercept (ll_Intercept) variable for the line length for each color image plane that was tested.

Figure 11:
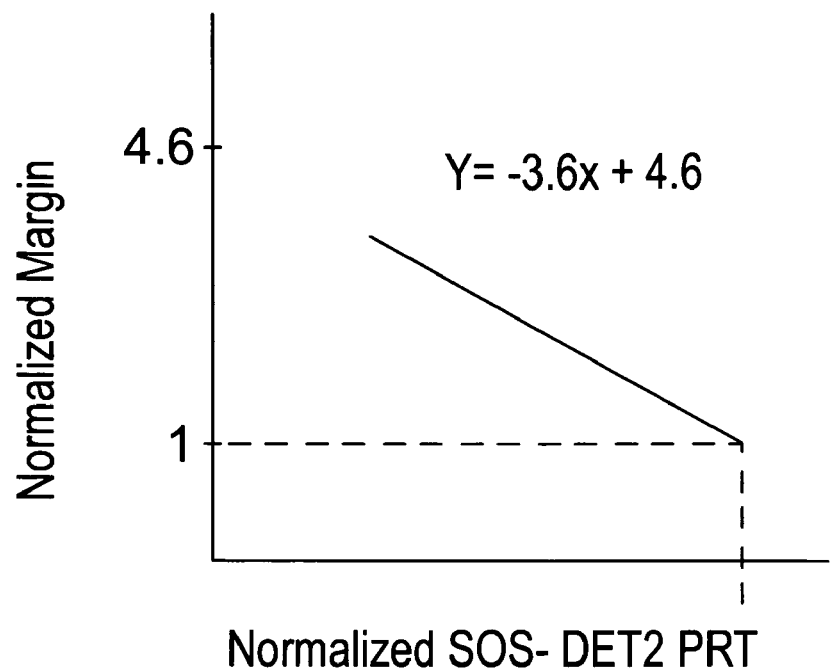
FIG. 11 is an exemplary plot of normalized margin length as a function of start of scan to detect to print scanner angle to derive a characterization of the changes to the margin as a function of temperature.
Figure 12:
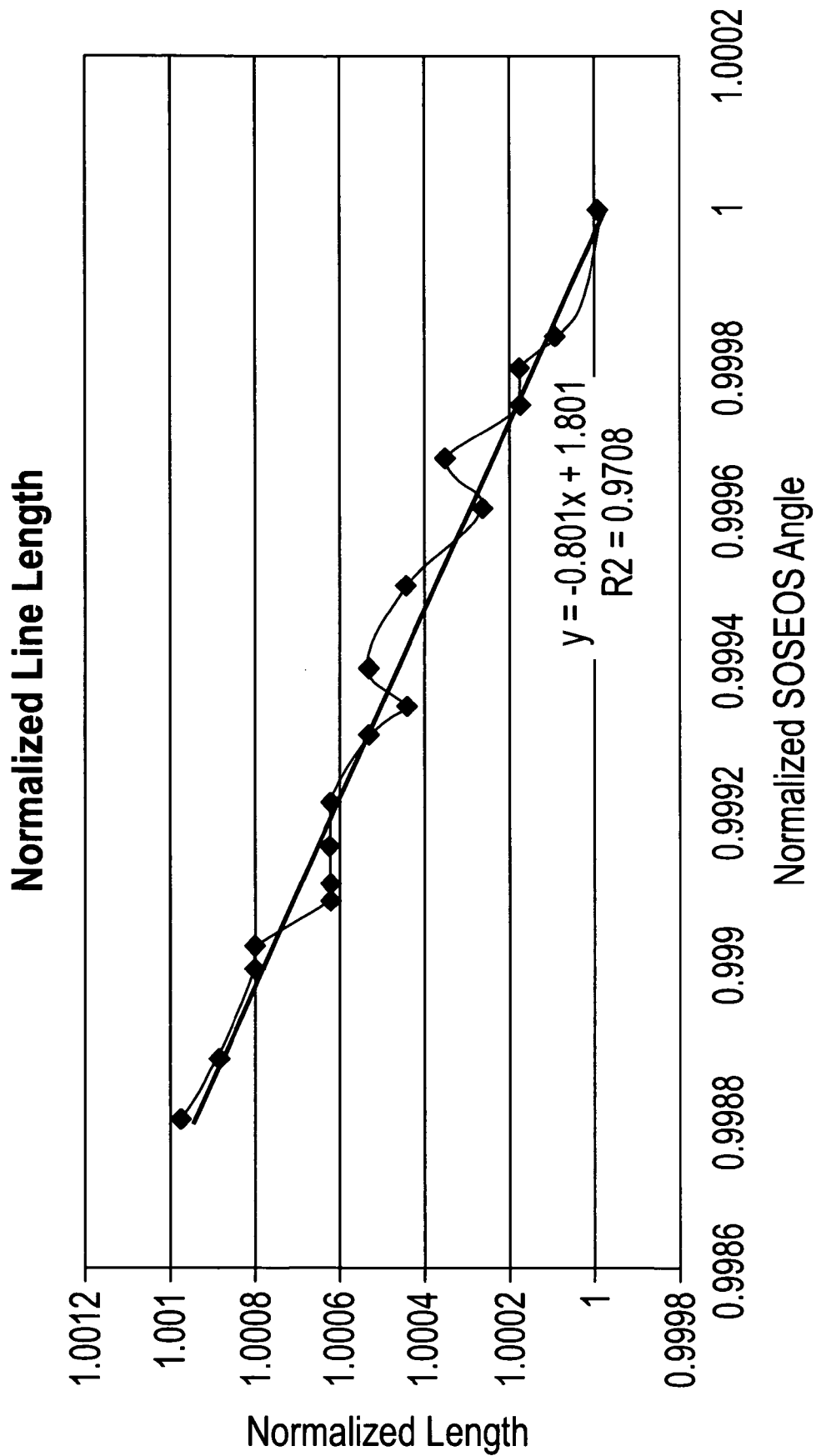
FIG. 12 is an exemplary plot of normalized line length as a function of start of scan to end of scan scanner angle to derive a characterization of the changes to line length as a function of temperature.

For example, FIG. 11 illustrates a linear curve fit for exemplary margin test points. Similarly, FIG. 12 illustrates a linear curve fit for exemplary line length test points. As such, through empirical testing and measurement, the slope and intercept for the line length and margin of each of the CYMK color planes may be determined in a manner that characterizes the effects of temperature and other operating conditions with regard to margin and line length.

Figure 13:
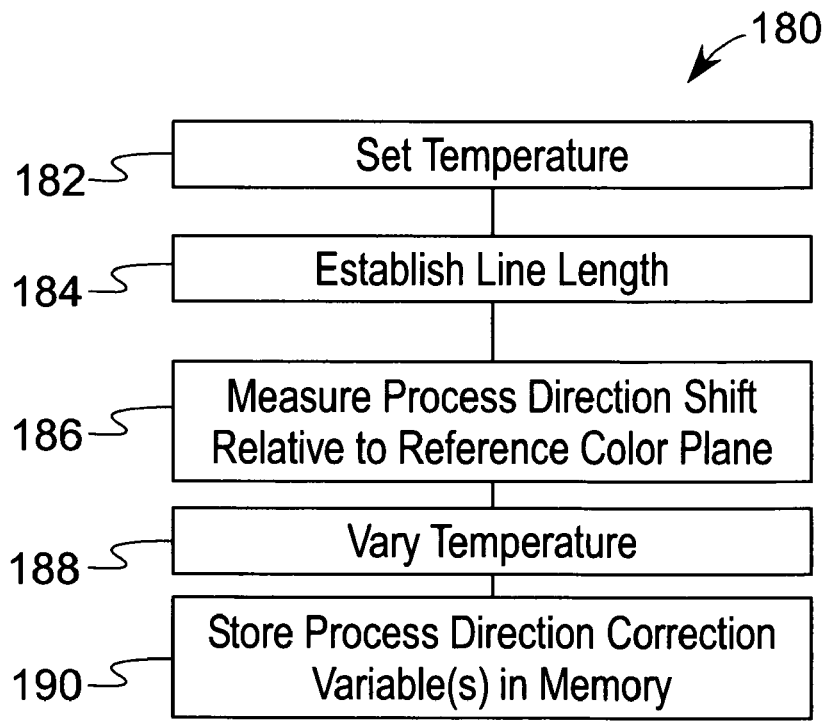
FIG. 13 is a flowchart of a method of characterizing process direction changes as a function of temperature.

FIG. 13 illustrates an exemplary method 180 of characterizing data for process direction shifts due to operating conditions, which may include changes in temperature. In the exemplary apparatus 10, process direction compensation may be applied to register the cyan, yellow and magenta color planes relative to the black color plane. Thus, the method 180 is repeated for each of the cyan, yellow and magenta color planes. A temperature is set at 182 and a line length measurement is taken at 184, e.g., by measuring the corresponding SOS-EOS interval such that the SOS-EOS angle as set out in greater detail herein. A processes direction color shift is then measured relative to a reference color plane, e.g., in the above-example, the reference color plane is the black color plane at 186. The above process may be repeated for multiple temperatures by varying the operating conditions, such as by varying temperature at 188 and looping back to measure the SOS-EOS interval at 184 and the corresponding process direction shift relative to the reference color plane at 186. After one or more suitable sets of process shift data points have been collected, a process direction compensation equation is derived at 190, which is designated herein as P_ThermalCorrection.

In one exemplary implementation, the process direction compensation equation is simplified to a constant value, designated a process direction compensation thermal correction value for each of the cyan, yellow and magenta image planes. As with the margin and line length characterizations, the process direction corrections may be based upon measurements of a printhead installed in its associated apparatus, in a test apparatus or in a suitable test fixture. Moreover, multiple printhead values may be tested and commingled into one compensation equation for a group of related apparatuses such as a product line, production batch, product family, etc. Process direction color shift may be measured by automated processes, e.g., electronic/optical systems, or manually, such as by printing and visually inspecting printed test sheets, or by scanning or otherwise electronically manipulating printed test sheets, etc. For example, keeping with the above-described test fixture, the process direction shift in one or more of the test points $P_0$-$P_{14}$ can be measured and manipulated using the test fixture.

Example of Performing Scan Path Compensation

As noted above, empirical testing may be used to derive characterizations of margin, line length and process direction shift as a function of operating condition such as temperature. This characterizing data may be predetermined and stored in a memory device on the apparatus 10. For purposes of discussion, exemplary values are shown to illustrate that, in practice, each color plane may have different characterizing data despite the observation that in the exemplary apparatus 10, beam pairs 16K, 16Y and 16M, 16C each share a common SOS-EOS measurement. Moreover, each apparatus or model of apparatus will likely have different characterizing variables and different characterizing values associated with those variables.

$ll\_Slope_{cyan} = -0.87$
$ll\_Intercept_{cyan} = 1 - ll\_Slope_{cyan}$
$det2prt\_Slope_{cyan} = -3.6$
$det2prt\_Intercept_{cyan} = 1 - det2prt\_Slope_{cyan}$
$P\_ThermalCorrection_{cyan} = -70$
$ll\_Slope_{yellow} = -0.90$
$ll\_Intercept_{yellow} = 1 - ll\_Slope_{yellow}$
$det2prt\_Slope_{yellow} = -3.7$
$det2prt\_Intercept_{yellow} = 1 - det2prt\_Slope_{yellow}$
$P\_ThermalCorrection_{yellow} = 15$
$ll\_Slope_{magenta} = -0.80$
$ll\_Intercept_{magenta} = 1 - ll\_Slope_{magenta}$
$det2prt\_Slope_{magenta} = -5.6$
$det2prt\_Intercept_{magenta} = 1 - det2prt\_Slope_{magenta}$
$P\_ThermalCorrection_{magenta} = -77$
$ll\_Slope_{black} = -0.84$
$ll\_Intercept_{black} = 1 - ll\_Slope_{black}$
$det2prt\_Slope_{black} = -5.7$
$det2prt\_Intercept_{black} = 1 - det2prt\_Slope_{black}$
$P\_ThermalCorrection_{black} = 0$ Computing Normalized Scan Path Compensation Values Referring back to FIG. 9, assuming that a baseline scan interval $Sample_{baseline}$ is determined at 122, a test sample interval $Sample_{current\_avg}$ is determined at 124, 126, and a normalized sample interval $$Sample_{norm} = \frac{Sample_{current\_avg}}{Sample_{baseline}}$$

is computed at 128, then normalized margin, line length and/or process shift values can be determined based upon the normalized sample ($Sample_{norm}$) and the above-described previously determined margin, line length and process direction characterizations. Continuing the example above, suitable equations may be derived as follows:

$Normalized\_det2prt_{cyan} = (Sample_{norm})_{cyan} * det2prt\_Slope_{cyan} + det2prt\_Intercept_{cyan}$ $Normalized\_ll_{cyan} = (Sample_{norm})_{cyan} * ll\_Slope_{cyan} + ll\_Intercept_{cyan}$ $Normalized\_process\_shift_{cyan} = (((Sample_{norm})_{cyan} - 1) * P\_ThermalCorrection_{cyan} * 1000)$ $Normalized\_det2prt_{yellow} = (Sample_{norm})_{yellow} * det2prt\_Slope_{yellow} + det2prt\_Intercept_{yellow}$ $Normalized\_ll_{yellow} = (Sample_{norm})_{yellow} * ll\_Slope_{yellow} + ll\_Intercept_{yellow}$ $Normalized\_process\_shift_{yellow} = (((Sample_{norm})_{yellow} - 1) * P\_ThermalCorrection_{yellow} * 1000)$ $Normalized\_det2prt_{magenta} = (Sample_{norm})_{magenta} * det2prt\_Slope_{magenta} + det2prt\_Intercept_{magenta}$ $Normalized\_ll_{magenta} = (Sample_{norm})_{magenta} * ll\_Slope_{magenta} + ll\_Intercept_{magenta}$ $Normalized\_process\_shift_{magenta} = (((Sample_{norm})_{magenta} - 1) * P\_ThermalCorrection_{magenta} * 1000)$ $Normalized\_det2prt_{black} = (Sample_{norm})_{black} * det2prt\_Slope_{black} + det2prt\_Intercept_{black}$ $Normalized\_ll_{black} = (Sample_{norm})_{black} * ll\_Slope_{black} + ll\_Intercept_{black}$ In the above equations, Normalized_det2prt corresponds to a normalized margin calculation and the Normalized_ll corresponds to a normalized line length calculation. With regard to the process shift, i.e., the Normalized_process_shift equations for each of the CYM image planes, the multiplication by 1000 is provided to convert the scale into microns. Other scaling arrangements may alternatively be implemented, e.g., depending upon the particular implementation including the appropriate units of the P_ThermalCorrection value. Also, there is no process direction compensation equation for the K image plane because each of the CYM image plane process direction compensation computations are relative to the K image plane.

Once the above-normalized values are computed, a predicted margin correction percentage, a predicted line length correction percentage and a predicted process shift are computed. Implementation of compensations based upon the computed corrections will be discussed below. Keeping with the above illustration, an exemplary way of computing the predicted correction percentages is to compute the error of the normalized det2prt (margin) from the ideal normalized det2prt (margin) and to compute the error of the normalized line length from the ideal normalized line length, respectively. Using the exemplary formulas above, the computed normalized process shift is simply the predicted process shift. For example:

$Predicted\_det2prt\_Correction_{cyan} =$

-continued $$100 * \left[\frac{1}{\text{Normalized\_det2prt}_{cyan}} - 1.000\right]$$

$$\text{Predicted\_ll\_Correction}_{cyan} = 100 * \left[\frac{1}{\text{Normalized\_ll}_{cyan}} - 1.000\right]$$

$$\text{Predicted\_process\_shift\_microns}_{cyan} = \text{Normalized\_process\_shift}_{cyan}$$

$$\text{Predicted\_det2prt\_Correction}_{yellow} =$$

$$100 * \left[\frac{1}{\text{Normalized\_det2prt}_{yellow}} - 1.000\right]$$

$$\text{Predicted\_ll\_Correction}_{yellow} = 100 * \left[\frac{1}{\text{Normalized\_ll}_{yellow}} - 1.000\right]$$

$$\text{Predicted\_process\_shift\_microns}_{yellow} = \text{Normalized\_process\_shift}_{yellow}$$

$$\text{Predicted\_det2prt\_Correction}_{magenta} =$$

$$100 * \left[\frac{1}{\text{Normalized\_det2prt}_{magenta}} - 1.000\right]$$

$$\text{Predicted\_ll\_Correction}_{magenta} = 100 * \left[\frac{1}{\text{Normalized\_ll}_{magenta}} - 1.000\right]$$

$$\text{Predicted\_process\_shift\_microns}_{magenta} = \text{Normalized\_process\_shift}_{magenta}$$

$$\text{Predicted\_det2prt\_Correction}_{black} =$$

$$100 * \left[\frac{1}{\text{Normalized\_det2prt}_{black}} - 1.000\right]$$

$$\text{Predicted\_ll\_Correction}_{black} = 100 * \left[\frac{1}{\text{Normalized\_ll}_{black}} - 1.000\right]$$

$$\text{Predicted\_process\_shift\_microns}_{black} = \text{Normalized\_process\_shift}_{black}$$

Margin Adjustment

As noted in greater detail herein, one exemplary approach to identify the margin is based upon the interval between SOS and a detect-to-print signal. Under this arrangement, the detect-to-print signal may comprise up to three or more components including a nominal detect-to-print value (DetToPrint$_{(nominal)}$), e.g., as determined during a factory manufacturing or calibration process, a detect-to-print registration offset (DetToPrint$_{(offset)}$), which comprises user-entered registration adjustments and other system adjustments entered into the controller 12 subsequent to manufacturing, and a detect-to-print thermal adjustment (DetToPrint$_{(thermal)}$), which is based upon the Predicted_det2prt_Correction value computed above.

The nominal detect-to-print value DetToPrint$_{(nominal)}$ may have been previously determined and stored in a memory device, e.g., on the printhead 14, or elsewhere in the apparatus in a location that is accessible by the controller 12. In this regard, it may be convenient to store the DetToPrint$_{(nominal)}$ value in terms of a nominal detect-to-print scanner angle ($A_{ndtp}$) in a manner analogous to the detect-to-print values discussed in greater detail herein.

Margin errors of one or more laser beams may result after a corresponding nominal detect-to-print value has been determined. So as to detect any adjustments that are necessary to a margin location, a user or technician can perform registration diagnostics and provide correction adjustments thereto, to compensate for registration offsets of one or more laser beams. For example, a test page may be printed and analyzed to detect whether margin location adjustments are necessary.

An operator can then provide DetToPrint$_{(offset)}$ adjustments, such as by entering correction values into an operator panel on the apparatus 10.

For example, a positive offset value entered into a first margin registration data may indicate an earlier starting of a scan line, i.e., the position the start of image data is moved closer to the corresponding edge a printed page and a negative offset value may indicate a later starting of a scan line. Moreover, the user-entered registration data may be entered using any suitable unit of measure. As such, certain conversions may be required, e.g., to convert operator entered correction values in terms of Print elements (Pels) to a corresponding scanner angle offset for data processing so that the nominal and user-entered values are in consistent units of measure.

According to one aspect of the present invention, the margin for the CYM color image planes are registered relative to the black color image plane. However, as noted in greater detail above, the beams 16K, 16Y travel across their drums in a scan direction that is opposite to the 16C, 16M beams. For example, the magenta and magenta beams 16C, 16M may sweep right to left and the black and yellow beams 16K, 16Y may sweep left to right. As such, the left right margin for the magenta and magenta image planes should substantially register with the right margin of the black image plane, and the left margin of the yellow image plane should substantially register with the left margin of the black image plane.

Accordingly, detect-to-print offset adjustments DetToPrint$_{(offset)}$ may be modified, e.g., to change or scale units to be compatible with the nominal detect-to-print value, e.g., $A_{ndtp}$, and some modification may be required to account for the potential for beams having opposite scan directions. For example, for the yellow image plane, the user registration detect-to-print offset value may be computed by converting the user-entered offset, e.g., in Pels, to units of time, which can then be converted to an offset angle $A_{offset}$.

The detect-to-print value may be further updated to compensate for thermal changes to the margin as follows:

$$\text{Det2prt\_BA} = (A_{ndtp} + A_{offset}) * (1.0 - \text{Predicted\_det2prt\_Correction}/100)$$

That is, the detect-to-print beam angle (Det2prt_BA) that is utilized by the apparatus 10 during imaging operations comprises the nominal detect-to-print value ($A_{ndtp}$), a detect-to-print offset ($A_{offset}$) that includes user registration data, corrections to account for scan path direction, e.g., relative to a reference color plane, and other system adjustments, in addition thermal and other time varying adjustments (1.0−Predicted_det2prt_Correction/100). Other conversion factors and data formats may alternatively be used. Moreover, in practice, the detect-to-print beam angle may be converted back to time, Pels or other suitable interval, depending upon the particular implementation of the margin registration system in a given apparatus.

Process Direction Position Correction

As noted in greater detail above, according to an exemplary embodiment of the present invention, the Predicted_process_shift_microns value is a constant value computed in microns that defines a process direction shift. The unit of microns may be converted to dots per inch to perform adjustments. For example, the apparatus 10 may be capable of printing in 1200×1200 dots per inch (dpi) or 600×2400 dpi modes of operation. If printing in 1200×1200 dpi, then the process direction can be shifted in 1200 dpi ($\frac{1}{1200}^{th}$ inch or approximately 21.2 micron) increments by the Vsync logic, e.g., by adjusting the count of the number of Hsync or SOS signals from the detection of the sheet 22 along the paper path before initiating the corresponding Vsync and associated imaging operation. As such, for each of the CYM color image planes, their respective Vsync signal can be modified to count more or less Hsync (SOS) signals by a factor of:

Predicted_process_shift_microns/Process_Direction_Scan_Resolution where the Process_Direction_Scan_Resolution is 21.2 microns in the instant example.

If the printer is in the 600×2400 mode, then the imaging system prints at 600 dpi in the process direction. As such, the controller 12 may implement process direction correction based upon Predicted_process_shift_microns in 600 dpi ($1/600^{th}$ inch or 42.3 micron) increments by the Vsync logic. The controller 12 may also implement Pel synthesis or other sub-process direction resolution corrections to the corresponding image data to perform process direction position adjustments based upon the determined Predicted_process_shift_microns, at suitable sub-process direction increments.

Still further, where the predicted process shift is expressed as a curve or other non-constant value, the controller 12 may warp or pre-distort one or more of the image files, e.g., by using all or a portion of the Predicted_process_shift_microns values to modify corresponding process direction values of corresponding bow profiles. A bow profile characterizes beam scan path errors so that image data can be electronically warped or otherwise shifted in the process direction to compensate for the inherent scan path errors.

The computation of a bow profile for performing process direction position errors is set out in detail in U.S. patent application Ser. No. 10/807,870; entitled "Algorithms And Methods For Determining Light Beam Process Direction Position Errors From Data Stored On A Printhead" and U.S. patent application Ser. No. 10/808,155, entitled "Electronic Systems And Methods For Reducing Laser Beam Process Direction Position Errors", each of which is incorporated by reference herein. Pel synthesis is further set out in U.S. patent application Ser. No. 10/808,155.

Line Length Adjustment

With the predicted line length corrections, e.g., Predicted_ll_Correction, computed, the beam scan paths can be modified to compensate for the associated line length magnification errors. For example, to modify the line length, a total magnification factor (Total_Mag) may be computed that takes into consideration, previously stored registration settings or other operational conditions (ll_Mag) as well as the predicted line thermal compensation (Additional_Slope_Multiplier). In general terms:

Additional_Slope_Multiplier=1.0−Predicted_ll_Correction/100

Total_Mag=ll_Mag*Additional_Slope_Multiplier

In the above exemplary computations, if it is assumed that non-thermal related line length compensation, such as may be derived from operator-entered registration data, is already taken into account or is not necessary in establishing the line length for a given color image plane, then the ll_Mag variable may be set to the value 1. If registration and other non-thermal corrections are not taken care of in different processes, such corrections may be integrated into the above or similarly derived formulas, e.g., by setting a value for ll_Mag.

As one example, a line length magnification can be computed that accounts for operator-entered registration data as follows:

ll_Mag=1.0−(ll_Change_Registration/Desired_ll)

where ll_Change_Registration represents user-entered, or other registration data used to adjust the line length from its nominal value, and Desired_ll corresponds to the nominal desired line length. The particular computation of the line length magnification ll_Mag will depend upon the relevant registration data and the manner in which that registration data is stored. As such, unit conversions and other manipulations may be required to convert the ll_Change_Registration and Desired_ll values to suitable units of measure.

With the total magnification computed, the corresponding line length can be compensated. The exact manner that the line length is adjusted will depend upon the particular implementation of the manner in which Pels are written to their associated PC drum. For example, by computing a line length magnification based at least upon the normalized line length, linearity correction data may be computed that is processed to generally evenly distributes print elements along a scan line based at least upon said line length magnification by varying the timing of select print elements along a scan line. One exemplary approach to modifying line length is discussed in greater detail below.

Light Beam Scan Path Compensation

In order to produce an accurate representation of an image to be printed, it may be desirable for each light beam 16K, 16Y, 16M, 16C to write to its corresponding PC drum 18K, 18Y, 18M, 18C in a scan-direction, which is defined by a line that is perpendicular to the direction of movement of the print media (or belt) relative to the PC drum 18K, 18Y, 18M, 18C, i.e., the process direction. Moreover, the light beams 16K, 16Y, 16M, 16C should be capable of writing a line of evenly spaced, print elements (Pels) on the surface of their associated PC drum 18K, 18Y, 18M, 18C.

The unavoidable imprecision in the shape and mounting of optical elements, e.g., in the post-scan optics 64 with respect to the light beams 16K, 16Y, 16M, 16C and/or their associated PC drum 18K, 18Y, 18M, 18C can introduce process direction errors in the path of travel of the beam when writing across a scan line, thus introducing bow into the scan path. It is also possible that a scan line written to the drum is not perpendicular to the movement of the print media due to light misalignment and/or media misregistration. Under these conditions, there may be a skew associated with the beam scan path.

Light Beam Scan Path Test Points

A model of each beam scan path may be constructed from a number of test points, e.g., by installing the printhead 14 into a test fixture such as that described above, or by using other suitable beam scan path measurement techniques. A plurality of test points, e.g., fifteen test points, $P_0$-$P_{14}$, may be identified at various locations for each of the CYMK image planes. The number of test points and the interval(s) upon which the test points are taken can vary depending upon the application. Measurements taken of these test points $P_0$-$P_{14}$, are stored in a memory device, such as a memory device provided on the printhead 14 or other suitable location that is accessible by the controller 12.

The measurements for the test point $P_0$ are expressed as Cartesian X (scan direction), Y (process direction) coordinates and as a scanner angle A, where $X_0$ represents the distance that test point $P_0$ lies from an arbitrary beam position origin in the scan direction, $Y_0$ represents the distance that test point $P_0$ lies from the beam position origin in the process direction and $A_0$ represents the angle of rotation of the polygon mirror from the corresponding SOS signal to position $P_0$. Any suitable unit of measure, may be used to record the measurement. The scan direction (X-axis) measurements for the remainder of the test points $P_1$-$P_{14}$, are taken relative to the preceding test point. For example, the measurement recorded for test point $P_1$ in the scan direction is the distance in the scan direction that test point $P_1$ lies from the test point $P_0$, etc.

Similarly, the angles $A_1$-$A_{14}$ are recorded relative to the preceding measurement to reduce storage requirements. That is, $A_1$ is the change in the angle of the rotating polygonal mirror relative to $A_0$, etc. Alternatively, each angle may be recorded relative to the start-of-scan signal 136 or other known reference. This approach allows the size of each measurement to be kept relatively small, and reduces the amount of space necessary to store the measurements in a memory device. Alternatively, each test points $P_1$-$P_{14}$ may be expressed using other suitable basis of measure.

A correlation may also be established between the printhead 14 and each of the CYMK scan planes by defining a printhead origin, i.e., a known, fixed point arbitrarily selected in the printhead 14. For convenience, the printhead datum is selected, e.g., a datum location on a printhead housing. However, any other position may alternatively be used. Also, the first beam position measurement, e.g., test point $P_0$, does not necessarily correspond to the Pel 0 location, i.e., the location where the first Pel that fits onto a physical page. Similarly, the last beam position measurement, e.g., test point $P_{14}$, does not necessarily need to correspond to the last Pel that can be written to a particular print medium, i.e., the last Pel that can be written to a physical page along a scan line.

An exemplary approach to measuring points along a light beam scan path is set out in U.S. patent application Ser. No. 10/808,043, entitled "Memory Device On Optical Scanner And Apparatus And Method For Storing Characterizing Information On The Memory Device" to the same assignee.

Process Direction Compensation

A bow profile may be constructed from the test points $P_0$-$P_{14}$ that essentially characterizes the process direction position errors of Pels written by an associated light beam of the printhead 14 as the light beam traverses across its scan path. By pre-warping the corresponding color plane image data, the effects of light beam process direction position errors are compensated.

In the above simplified example, the process direction thermal correction value Predicted_process_shift_microns was determined to be a constant value. However, if the amount of process direction correction is to be applied differently across the scan line, e.g. based upon a more complicated process direction correction characterization, then the image file to be printed may be warped (or further warped) or otherwise shifted in memory to correspond to the associated additional thermal process direction correction. For example, by modifying the Y component of the test points based upon the process direction thermal characterization, the associated bow profile can be recomputed for a given imaging operation.

As noted above, the computation of a bow profile for performing process direction position errors is set out in detail in U.S. patent application Ser. No. 10/807,870; entitled "Algorithms And Methods For Determining Light Beam Process Direction Position Errors From Data Stored On A Printhead" and U.S. patent application Ser. No. 10/808,155, entitled "Electronic Systems And Methods For Reducing Laser Beam Process Direction Position Errors".

Scan Line Nonlinearity

In the exemplary apparatus 10, the rotational velocity of the polygon mirror is maintained at a substantially constant velocity during imaging operations regardless of line and margin changes due to operating conditions such as temperature, etc. However, the velocity of each light beam varies across its scan line. This is best seen with reference to FIG. 2 because the distance between the corresponding point on the polygon mirror 46 from which each light beam is reflected and the associated fold down mirror 48, 50 is greater at the edges of the corresponding scan line than generally within the middle of the scan line. Thus, a change in the scan direction angle of each light beam, designated $\Delta A$ generally at the beginning of each scan line causes a corresponding sweep across its fold down mirror 48, 50 by a first distance d1.

Figure 7:
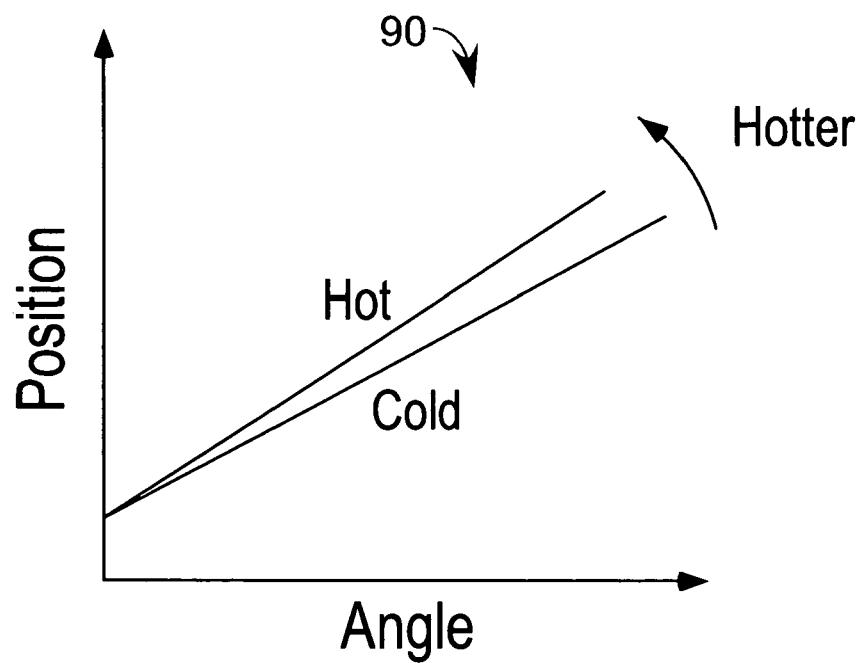
FIG. 7 is an exemplary graph illustrating the general shift of a scan line as a function of temperature.

When each light beam rotates through the same angle ($\Delta A$) generally towards the middle of the scan line, the corresponding light beams travel a distance of d2, which is less than d1 as can be easily derived from standard geometry. This typically causes consecutive Pels to be written farther apart near the ends of the scan line, and closer together near the middle portion of the scan line, despite the constant rotational velocity ($\omega$) of the polygon mirror 46. Further, as noted above, in the exemplary apparatus 10, as the temperature increases, the line length increases as represented in FIG. 7, thus the spacing between adjacent Pels also increases. Similarly, as the temperature decreases, the line length also decreases.

Image Data Modulation

In the exemplary apparatus 10, during printing operations, each beam 16K, 16Y, 16M, 16C is modulated by a light signal that is based upon the bow and skew compensated image data for an associated color image plane, and is encoded such that each pixel of bitmap image data is represented by a plurality of video "slices", i.e. fixed frequency slice clock pulses, which together define a corresponding Pel along a scan line of an associated photoconductive drum. The number of slice clock pulses per Pel is arbitrary and will depend upon the desired print resolution. More particularly, each registration system includes a Pel slice count register that stores a value corresponding to a number of slice clock pulses comprising a nominal Pel clock pulse, which is designated herein as N. However, the period of the Pel clock may vary from its nominal value of N slices by inserting additional blank slices into select Pels. This has the effect of spacing out corresponding Pels written along a scan line. The slice clock insertions into select nominal Pel clock pulses can be distributed across a corresponding scan line in any manner and is based upon characterizing information of the corresponding light beam scan path, which is stored in a memory of the apparatus.

During an imaging operation, each color image plane bitmap is processed by its corresponding video processor or other logic in the controller 12, which converts bitmap image data that has been "prewarped", i.e., bow and skew compensated according to the corresponding bow profile into a plurality of Pels in the form of a signal suitable for modulating the corresponding light in the printhead 14. Each video processor of the controller 12 receives timing information for writing their plurality of Pels from an associated registration system of the controller 12. Correspondingly, each registration system derives timing information based upon their corresponding scan line linearity profile so that inherent light beam scan line velocity changes are generally compensated. Each registration system generates a unique Pel clock that is used to establish the timing of when Pels are written to the corresponding light source on the printhead 14. As such, each Pel clock is used to control the spacing between associated Pels, i.e., the timing of when each Pel is written to a corresponding photoconductive drum.

Algorithm for Building the Linearity Profile

Thermally induced line length magnification can thus be compensated for by adjusting the number of slice clock insertions that are performed when writing Pels across a scan line. The slice clock insertions can be distributed across a corresponding scan line in any manner to derive a more linear scan line. Essentially, increasing the number of slice clock insertions performed lengthens a scan line of written Pels and decreasing the number of slice clock insertions decreases the overall scan line of written Pels. To implement slice clock insertions, data related to slice clock insertions and their corresponding Pel locations are stored in a linearity table in the controller 12. The values stored in the linearity table are determined from a linearity profile explained below.

The scan direction position of an arbitrary light beam point $P_j$ along a scan path of an associated light beam can be described by both its scan direction distance measurement $X_j$, and its corresponding polygonal mirror angle $A_j$. This observation is useful for characterizing linearity corrections and line length magnification.

Exemplary Approach to Line Length Compensation

Figure 14:
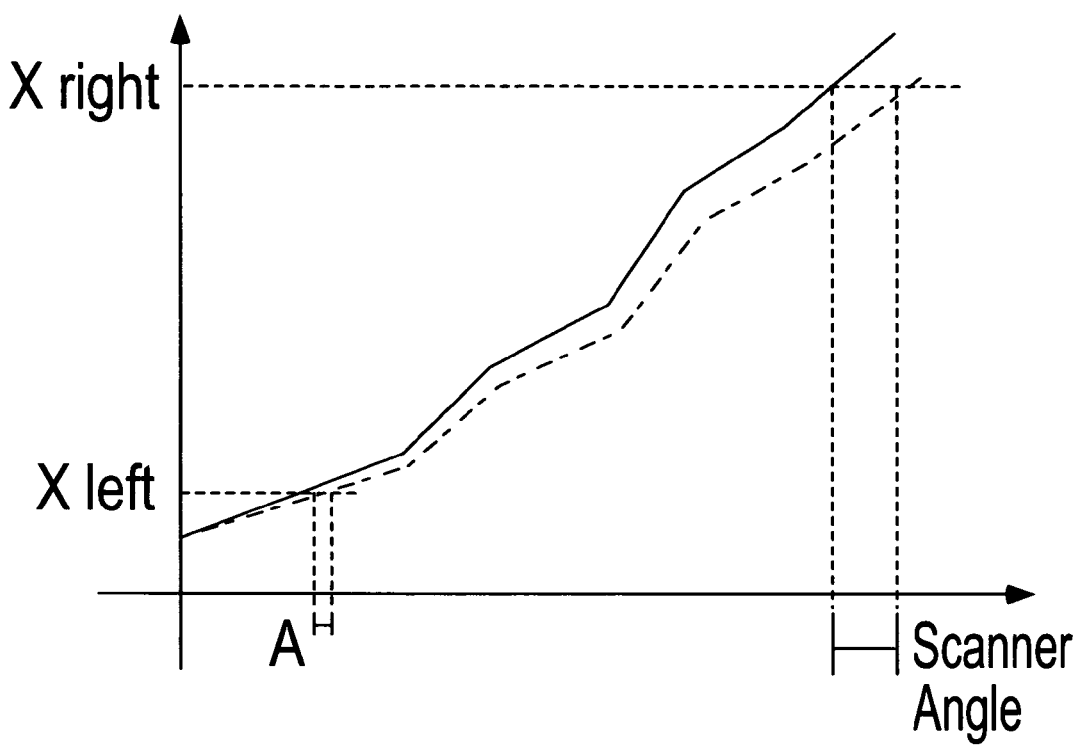
FIG. 14 is a plot of scanner angle as a function of scan direction position to illustrate an exemplary approach for line length compensation.

Referring to FIG. 14, the test data points in each light beam scan path model, e.g., $P_0$-$P_{14}$, are plotted on a graph illustrating scan direction position measurements (X[k]) on the axis of ordinate and the corresponding polygonal mirror angles A (in degrees) Angle[k] on the axis of abscissa. The plotted scan direction distance values may include previously considered registration data if such data is not factored into the Total_Mag value as noted in greater detail above.

For purposes of discussion, each of the points may be connected by straight lines thus approximating the general shape of the light beam scan path model by a series of piecewise linear segments. Accordingly, linear interpolation techniques can be used to derive information about any point along the light beam scan path by extracting data along a corresponding linear segment. However, more sophisticated curve fitting techniques may alternatively be used depending upon the desired precision of the linearity correction required.

Essentially, a rotation of the above piecewise linear profile is performed by rotating the profile about a first beam description point, which is shown as the point on the axis of ordinate. The slope of each plotted segment is computed and a new slope is determined based upon the desired shift in line length, i.e., the computed Total_Mag value, which is described in detail above. When the line segments are rotated as described in greater detail below, each light beam angle measurement ($A_j$) is unchanged. However, a new set of scan direction values ($X_j$) are determined for each corresponding rotating polygonal mirror angle in the corresponding light beam scan path model.

For example, for each beam, each slope segment may be computed.

$$m = \frac{(X[i+1] - X[i])}{Angle[i+1] - Angle[i]}$$

Next, the slope of each segment is altered based upon the previously computed total multiplier.

$$m_{newi+1} = m_{i+1} * Total\_Mag$$

With the new slopes computed, the new scan direction values, i.e., the X positions ($X_j$), for each test point are recomputed. In the illustrated plot of FIG. 14, the associated beam is assumed to sweep left to right, thus the rotation is performed around the first test point. Because the rotation is performed about the first test point, which is illustrated on the axis of the ordinate in the present example, the first X location, corresponding to the first test point is maintained without change. The X locations for each of the remaining test points are updated based upon the preceding updates.

$$X[i+1] = X[i] + (Angle[i+1] - Angle[i]) * m_{newi+1}$$

Construction of a Linearity Profile

With new scan direction positions updated for the test points $P_0$-$P_{14}$, associated linearity profiles may be built by working across the scan line. An accumulated angle is initialized, and is then built based upon previous selections of the linearity profile, e.g., by working across the scan line. At each decision point, e.g., each new Pel position or some multiple of Pel positions, two position errors are computed. A first error assumes that the registration hardware processes an output Pel having no slice insertions into the corresponding nominal Pel clock signal, and the second error assumes that a slice insertion is performed for that Pel position. A choice is made whether to perform a slice insertion based on the minimum error between the first and second error values. The new accumulated angle is updated based on the selection.

Exemplary manners of implementing and printing using the above described scan line linearity correction is further set out in U.S. patent application Ser. No. 10/808,130, entitled "Systems For Performing Light Beam Linearity Correction And Algorithms And Methods For Generating Linearity Correction Tables From Data Stored In An Optical Scanner", which is hereby incorporated by reference herein.

Moreover, the present invention may be implemented on other electrophotographic devices, such as copiers, facsimile machines and multi-function machines. Having described the invention in detail and by reference to preferred embodiments thereof, it will be apparent that modifications and variations are possible without departing from the scope of the invention defined in the appended claims.

What is claimed is:

1. A method of correcting for scan path errors in an electrophotographic device comprising:
    defining a baseline scan interval by sampling a scan line interval at a first time;
    establishing line length characterizing data that characterizes line length variations as a function of at least one operating condition;
    defining a test sample interval by sampling said scan line interval at a second time;
    computing a normalized sample by normalizing said test sample interval relative to said baseline scan interval;
    computing a normalized line length based upon said normalized sample and said line length characterizing data;

computing a line length magnification based at least upon said normalized line length; and computing linearity correction data that is processed to generally evenly distribute print elements along a scan line based at least upon said line length magnification by varying the timing of select print elements along a scan line.

2. The method according to claim 1, wherein said test sample interval comprises a moving average of at least two previously determined samples, wherein each previously determined sample comprises an average of start-of-scan to end-of-scan timing across each facet of a polygon mirror.

3. The method according to claim 2, further comprising:
generating test sample intervals based upon predetermined events;
storing said test sample intervals in a memory along with a time; and
only including test sample intervals in said moving average if said test sample intervals are within a predetermined age based upon said time stored for each sample interval.

4. The method according to claim 1, wherein said at least one operating condition comprises variation in temperature, and said line length characterizing data is defined comprising:
measuring a first line length at a first temperature;
measuring a first scanner angle at said first temperature;
altering the temperature;
measuring said line length at said altered temperature;
measuring said scanner angle at said altered temperature;
deriving a curve fitting equation that corresponds to a curve of a plot of said first line length as a function of said first scanner angle with respect to said altered line length as a function of said altered scanner angle;
storing data that defines said curve as said line length characterizing data.

5. The method according to claim 4, further comprising expressing said curve as a linear equation in slope intercept form wherein the slope and intercept are stored as said line length temperature data.

6. The method according to claim 1, further comprising:
establishing margin characterizing data that characterizes margin variations as a function of said at least one operating condition;
computing a normalized margin based upon said normalized sample and said margin characterizing data;
computing margin magnification based upon at least said normalized margin; and
computing a new margin value based at least upon said margin magnification.

7. The method according to claim 1, further comprising:
establishing process direction characterizing data that characterizes process direction variations as a function of said at least one operating condition;
computing a normalized process shift based upon said normalized sample and said margin characterizing data; and
implementing a process correction based at least upon said normalized process shift.

8. A system for correcting time varying scan path errors in an electrophotographic device comprising:
a controller;
a polygon mirror controlled by said controller to rotate at a constant velocity and to direct a beam to sweep across a photoconductive surface, said beam modulated based upon image data supplied by said controller;
at least one sensor communicably coupled to said controller for determining at least one of a start of scan and an end of scan to define a scan interval; and a memory device having stored therein, line length characterizing data that characterizes a line length as a function of at least one operating condition and a baseline scan interval determined by sampling a scan line interval at a first time;
wherein said controller is operatively configured to:
sample said scan line interval at a second time;
compute a normalized sample by normalizing said test sample interval relative to said baseline scan interval;
compute a normalized line length based upon said normalized sample and said line length characterizing data;
compute a line length magnification based at least upon said normalized line length; and
compute linearity correction data that is processed to generally evenly distribute print elements along a scan line based at least upon said line length magnification by varying the timing of select print elements along a scan line.

9. The system according to claim 8, further comprising a first post scan optical lens in a beam path between said polygon mirror and said photoconductive surface that accounts for at least a portion of scan direction errors caused by said at least one operating condition, wherein said at least one sensor receives said beam after passing through said first post scan optical lens.

10. The system according to claim 8, wherein said controller is operatively configured to collect a test sample that comprises an average of said scan line interval across all facets of said polygon mirror based upon at least one predetermined event, said controller further configured to store each test sample along with an associated time stamp in said memory.

11. The system according to claim 8, wherein:
said system further comprises at least four light beams, each light beam corresponding to an associated color image plane;
said at least one sensor further comprises:
a first synchronization system for determining a start of scan to end of scan interval for a first pair of said light beams and
a second synchronization system for determining a start of scan to end of scan interval for a second pair of said light beams;
said memory device has stored therein, line length data that characterizes a line length as a function of at least one operating condition that is unique to each light beam and a baseline scan interval determined by sampling a scan line interval at a first time for each of said first and second pairs of light beams; and
wherein said controller is operatively configured to:
sample said scan line interval at a second time for each pair of said light beams;
compute a normalized sample by normalizing said test sample interval relative to said corresponding baseline scan interval for each pair of light beams;
compute a normalized line length for each light beam based upon its associated one of said normalized samples and said unique line length characterizing data stored in said memory;
compute for each light beam, a line length magnification based upon said normalized line length; and
compute for each light beam, linearity correction data that generally evenly distributes print elements along a scan line based at least upon said line length magnification.

12. The system according to claim 11, further comprising a post scan optical system that includes a first optical lens that is common to each beam of said first pair of beams and a second optical lens that is common to each beam of said second pair of beams, wherein:
said first and second optical lenses account for at least a portion of scan direction errors caused by said at least one operating condition in each of said beams, and
said at least one sensor read by said controller comprises:
a first sensor detects at least a first start of scan after a select on beam of said first pair of beams passes through said first optical lens; and
a second sensor detects at least a second start of scan after a select on beam of said second pair of beams passes through said second optical lens.

13. The system according to claim 8, wherein:
said memory device further has stored therein, margin characterizing data that characterizes a margin value as a function of at least one operating condition and a baseline margin interval determined by sampling a margin interval at a first time; and
said controller is further operatively configured to:
compute a normalized margin based upon said normalized sample and said margin characterizing data;
compute margin magnification based upon at least said normalized margin; and
compute a new margin based at least upon said margin magnification.

14. The system according to claim 8, wherein:
said memory device further has stored therein, direction characterizing data that characterizes process direction variations as a function of said at least one operating condition; and
said controller is further operatively configured to:
compute a normalized process shift based upon said normalized sample and said margin characterizing data; and
implement a process correction based at least upon said normalized process shift.

15. A method of correcting temperature induced scan path errors in an electrophotographic device comprising:
defining a baseline scan interval by sampling a scan line interval at a first time;
establishing margin temperature data that characterizes a margin as a function of temperature;
establishing line length temperature data that characterizes line length as a function of temperature;
establishing thermal compensation temperature data that characterizes process direction position shifts as a function of temperature;
defining a test sample interval by sampling said scan line interval at a second time;
computing a normalized sample by normalizing said test sample interval relative to said baseline scan interval;
computing a normalized margin based upon said normalized sample and said margin temperature data;
computing a normalized line length based upon said normalized sample and said line length temperature data;
computing a normalized process shift based upon said normalized sample and said thermal compensation temperature data;
computing a margin magnification based at least upon said normalized margin;
computing a line length magnification based at least upon said normalized line length;
computing linearity correction data that generally evenly distributes print elements along a scan line based at least upon said margin magnification and said line length magnification; and
performing process direction compensation based at least in part upon said normalized process shift.

16. The method according to claim 15, wherein said linearity correction data and said process direction compensation are performed based upon predetermined events, wherein said predetermined events that trigger said process direction linearity correction are different from said events that trigger said process direction compensation.

17. The method according to claim 15, wherein said margin temperature data is derived by a process comprising:
setting a base temperature;
establishing a baseline margin;
repeating for at least one time:
varying the temperature;
determining the margin; and
normalizing said margin to said baseline margin to define margin test point;
curve fitting said margin test points;
deriving said margin temperature data based upon said curve fitting.

18. The method according to claim 15, wherein said line length temperature data is derived by a process comprising:
setting a base temperature;
establishing a baseline line length;
repeating for at least one time:
varying the temperature;
determining the line length; and
normalizing said line length to said baseline line length to define line length test point;
curve fitting said line length test points;
deriving said line length temperature data based upon said curve fitting.

19. The method according to claim 15, wherein said thermal compensation temperature data is derived by a process comprising:
performing for a plurality of times:
varying a temperature;
determining a line interval; and
measuring a process direction shift relative to a reference color plane; and
deriving a process direction correction value based upon said process direction shift as a function of said line interval.

20. The method according to claim 15, wherein said margin temperature data, line length temperature data and thermal compensation temperature data are derived from at least one of a unique system or a batch of similarly manufactured systems, systems from a same product line or systems from a same product family that share the same line length temperature data and thermal compensation temperature data.

* * * * *